(12) United States Patent
Ronagh et al.

(10) Patent No.: US 11,797,641 B2
(45) Date of Patent: Oct. 24, 2023

(54) METHOD AND SYSTEM FOR SOLVING THE LAGRANGIAN DUAL OF A CONSTRAINED BINARY QUADRATIC PROGRAMMING PROBLEM USING A QUANTUM ANNEALER

(71) Applicant: 1QB INFORMATION TECHNOLOGIES INC., Vancouver (CA)

(72) Inventors: Pooya Ronagh, Vancouver (CA); Sahar Karimi, Vancouver (CA)

(73) Assignee: 1QB Information Technologies Inc., Vancouver (CA)

( * ) Notice: Subject to any disclaimer, the term of this patent is extended or adjusted under 35 U.S.C. 154(b) by 0 days.

(21) Appl. No.: 18/047,981

(22) Filed: Oct. 19, 2022

(65) Prior Publication Data
US 2023/0067878 A1    Mar. 2, 2023

Related U.S. Application Data

(63) Continuation-in-part of application No. 16/811,479, filed on Mar. 6, 2020, which is a continuation of
(Continued)

(30) Foreign Application Priority Data
Feb. 3, 2015   (CA) .................................. CA 2881033

(51) Int. Cl.
  *G06F 17/11*    (2006.01)
  *G06N 5/01*     (2023.01)
  *G06N 10/00*    (2022.01)
(52) U.S. Cl.
  CPC ............... *G06F 17/11* (2013.01); *G06N 5/01* (2023.01); *G06N 10/00* (2019.01)

(58) Field of Classification Search
  CPC ...................................................... G06F 17/11
(Continued)

(56) References Cited

U.S. PATENT DOCUMENTS

| 6,221,592 B1 | 4/2001 | Schwartz et al. |
| 7,113,967 B2 | 9/2006 | Cleve et al. |

(Continued)

FOREIGN PATENT DOCUMENTS

| CA | 2840958 A1 | 1/2013 |
| CA | 2881033 A1 | 4/2015 |

(Continued)

OTHER PUBLICATIONS

Aggarwal et al.: Evolutionary network analysis: A survey. ACM Computing Surveys 47(1):10:1-10:36 (2014).
(Continued)

*Primary Examiner* — Eric D Lee
(74) *Attorney, Agent, or Firm* — Wilson Sonsini Goodrich & Rosati

(57) ABSTRACT

A method is disclosed for solving the Lagrangian dual of a constrained binary quadratic programming problem. The method comprises obtaining a constrained quadratic binary programming problem; until a convergence is detected, iteratively, performing a Lagrangian relaxation of the constrained quadratic binary programming problem to provide an unconstrained quadratic binary programming problem, providing the unconstrained quadratic binary programming problem to a quantum annealer, obtaining from the quantum annealer at least one corresponding solution, using the at least one corresponding solution to generate a new approximation for the Lagrangian dual bound; and providing a corresponding solution to the Lagrangian dual of the constrained binary quadratic programming problem after convergence.

20 Claims, 6 Drawing Sheets

Related U.S. Application Data application No. 15/051,271, filed on Feb. 23, 2016, now abandoned, application No. 18/047,981 is a continuation-in-part of application No. 16/809,473, filed on Mar. 4, 2020, now Pat. No. 11,514,134, which is a continuation of application No. 15/014,576, filed on Feb. 3, 2016, now abandoned.

(58) Field of Classification Search
USPC .......................................................... 706/19
See application file for complete search history.

(56) References Cited

U.S. PATENT DOCUMENTS

| | | |
|---|---|---|
| 7,135,701 B2 | 11/2006 | Amin et al. |
| 7,234,144 B2 | 6/2007 | Wilt et al. |
| 7,418,283 B2 | 8/2008 | Amin et al. |
| 7,533,068 B2 | 5/2009 | Maassen et al. |
| 7,619,437 B2 | 11/2009 | Thom et al. |
| 7,639,035 B2 | 12/2009 | Berkley |
| 7,660,533 B1 | 2/2010 | Meyers et al. |
| 7,805,079 B1 | 9/2010 | Meyers et al. |
| 7,898,282 B2 | 3/2011 | Harris et al. |
| 7,984,012 B2 | 7/2011 | Coury et al. |
| 8,008,942 B2 | 8/2011 | Van et al. |
| 8,126,649 B2 | 2/2012 | Frasch et al. |
| 8,175,995 B2 | 5/2012 | Amin |
| 8,195,596 B2 | 6/2012 | Rose et al. |
| 8,195,726 B2 | 6/2012 | Macready et al. |
| 8,219,605 B2 | 7/2012 | Cowlishaw et al. |
| 8,230,432 B2 | 7/2012 | Bryant et al. |
| 8,244,662 B2 | 8/2012 | Coury et al. |
| 8,283,943 B2 | 10/2012 | Van Den Brink et al. |
| 8,421,053 B2 | 4/2013 | Bunyk et al. |
| 8,503,885 B2 | 8/2013 | Meyers et al. |
| 8,655,828 B2 | 2/2014 | Rose |
| 8,832,165 B2 | 9/2014 | Allen et al. |
| 9,537,953 B1 | 1/2017 | Dadashikelayeh et al. |
| 9,660,859 B1 | 5/2017 | Dadashikelayeh et al. |
| 9,727,824 B2 | 8/2017 | Rose et al. |
| 9,870,273 B2 | 1/2018 | Dadashikelayeh et al. |
| 9,881,256 B2 | 1/2018 | Hamze et al. |
| 10,044,638 B2 | 8/2018 | Dadashikelayeh et al. |
| 10,152,358 B2 | 12/2018 | Dadashikelayeh et al. |
| 10,223,084 B1 | 3/2019 | Dunn |
| 10,339,466 B1 | 7/2019 | Ding et al. |
| 10,346,748 B2 | 7/2019 | Aspuru-Guzik et al. |
| 10,484,479 B2 | 11/2019 | Johnson et al. |
| 10,558,932 B1 | 2/2020 | Neven et al. |
| 10,614,370 B2 | 4/2020 | Johnson et al. |
| 10,713,582 B2 | 7/2020 | Dadashikelayeh |
| 10,824,478 B2 | 11/2020 | Dadashikelayeh et al. |
| 10,826,845 B2 | 11/2020 | Dadashikelayeh et al. |
| 10,929,294 B2 | 2/2021 | Brahm et al. |
| 11,017,289 B2 | 5/2021 | Crawford et al. |
| 11,196,775 B1 | 12/2021 | Badawy et al. |
| 11,205,275 B2 | 12/2021 | Oami et al. |
| 11,514,134 B2 | 11/2022 | Ronagh et al. |
| 2003/0005068 A1 | 1/2003 | Nickel et al. |
| 2003/0121028 A1 | 6/2003 | Coury et al. |
| 2004/0254735 A1 | 12/2004 | Horn et al. |
| 2004/0267916 A1 | 12/2004 | Chambliss et al. |
| 2005/0027458 A1 | 2/2005 | Merz, Jr. et al. |
| 2005/0182614 A1 | 8/2005 | Meredith |
| 2005/0187844 A1 | 8/2005 | Chalermkraivuth et al. |
| 2005/0250651 A1 | 11/2005 | Amin et al. |
| 2005/0273306 A1 | 12/2005 | Hilton et al. |
| 2006/0221978 A1 | 10/2006 | Venkatachalam |
| 2006/0225165 A1 | 10/2006 | Maassen Van Den Brink et al. |
| 2007/0177634 A1 | 8/2007 | Beausoleil et al. |
| 2007/0180586 A1 | 8/2007 | Amin |
| 2007/0215862 A1 | 9/2007 | Beausoleil et al. |
| 2007/0239366 A1 | 10/2007 | Hilton et al. |
| 2008/0059547 A1 | 3/2008 | Taylor |
| 2008/0065573 A1* | 3/2008 | Macready ............... G06N 7/08 706/19 |
| 2008/0186918 A1 | 8/2008 | Tinnakornsrisuphap et al. |
| 2008/0215850 A1 | 9/2008 | Berkley et al. |
| 2008/0218519 A1 | 9/2008 | Coury et al. |
| 2008/0262990 A1 | 10/2008 | Kapoor et al. |
| 2008/0313430 A1 | 12/2008 | Bunyk |
| 2009/0050357 A1 | 2/2009 | Suzuki |
| 2009/0070402 A1 | 3/2009 | Rose et al. |
| 2009/0078932 A1 | 3/2009 | Amin |
| 2009/0164435 A1 | 6/2009 | Routt |
| 2009/0182542 A9 | 7/2009 | Hilton et al. |
| 2009/0306902 A1 | 12/2009 | Lemmen et al. |
| 2009/0325694 A1 | 12/2009 | Beckman et al. |
| 2010/0076913 A1 | 3/2010 | Yang et al. |
| 2010/0261481 A1 | 10/2010 | Resende et al. |
| 2010/0306142 A1 | 12/2010 | Amin |
| 2011/0047201 A1 | 2/2011 | Macready et al. |
| 2011/0231462 A1 | 9/2011 | Macready et al. |
| 2011/0238378 A1 | 9/2011 | Allen et al. |
| 2011/0238855 A1 | 9/2011 | Korsunsky et al. |
| 2011/0296229 A1 | 12/2011 | Cowlishaw et al. |
| 2012/0072579 A1 | 3/2012 | Teather |
| 2012/0084242 A1 | 4/2012 | Levin |
| 2012/0159506 A1 | 6/2012 | Barham et al. |
| 2012/0215821 A1 | 8/2012 | Macready et al. |
| 2012/0240185 A1 | 9/2012 | Kapoor et al. |
| 2012/0253926 A1 | 10/2012 | Chen et al. |
| 2012/0254586 A1 | 10/2012 | Amin et al. |
| 2012/0278374 A1 | 11/2012 | Cowlishaw et al. |
| 2012/0326720 A1 | 12/2012 | Gambetta et al. |
| 2013/0026183 A1 | 1/2013 | Foster |
| 2013/0144925 A1 | 6/2013 | Macready et al. |
| 2013/0263131 A1 | 10/2013 | Beda, III et al. |
| 2013/0308956 A1 | 11/2013 | Meyers et al. |
| 2013/0336472 A1 | 12/2013 | Fahlgren et al. |
| 2014/0025606 A1 | 1/2014 | Macready |
| 2014/0067808 A1 | 3/2014 | Narang et al. |
| 2014/0122702 A1 | 5/2014 | Jung et al. |
| 2014/0123325 A1 | 5/2014 | Jung et al. |
| 2014/0187427 A1 | 7/2014 | Macready et al. |
| 2014/0214257 A1 | 7/2014 | Williams et al. |
| 2014/0250288 A1 | 9/2014 | Roy |
| 2014/0258730 A1 | 9/2014 | Stecher |
| 2014/0324933 A1 | 10/2014 | Macready et al. |
| 2014/0337612 A1 | 11/2014 | Williams |
| 2014/0344322 A1 | 11/2014 | Ranjbar |
| 2014/0379924 A1 | 12/2014 | Das et al. |
| 2015/0006443 A1 | 1/2015 | Rose et al. |
| 2015/0032991 A1 | 1/2015 | Lanting et al. |
| 2015/0032993 A1 | 1/2015 | Amin et al. |
| 2015/0055961 A1 | 2/2015 | Meyers et al. |
| 2015/0106413 A1 | 4/2015 | Ronagh |
| 2015/0111754 A1 | 4/2015 | Harris et al. |
| 2015/0120551 A1 | 4/2015 | Jung et al. |
| 2015/0120555 A1 | 4/2015 | Jung et al. |
| 2015/0142398 A1 | 5/2015 | Miller, III et al. |
| 2015/0169746 A1 | 6/2015 | Hatami-Hanza |
| 2015/0178349 A1 | 6/2015 | Niewodniczanski et al. |
| 2015/0193692 A1 | 7/2015 | Israel |
| 2015/0205759 A1 | 7/2015 | Israel et al. |
| 2015/0220852 A1 | 8/2015 | Hatami-Hanza |
| 2015/0227559 A1 | 8/2015 | Hatami-Hanza |
| 2015/0262074 A1 | 9/2015 | Bruestle et al. |
| 2015/0269124 A1 | 9/2015 | Hamze et al. |
| 2015/0269243 A1 | 9/2015 | Kobayashi |
| 2015/0332994 A1 | 11/2015 | Mallik et al. |
| 2015/0349960 A1 | 12/2015 | Bagley |
| 2015/0358251 A1 | 12/2015 | Varga et al. |
| 2015/0363358 A1 | 12/2015 | Ronagh et al. |
| 2015/0363708 A1 | 12/2015 | Amin et al. |
| 2016/0026183 A1 | 1/2016 | Williams et al. |
| 2016/0071021 A1 | 3/2016 | Raymond |
| 2016/0132785 A1 | 5/2016 | Amin et al. |
| 2016/0162798 A1 | 6/2016 | Marandi et al. |
| 2016/0171368 A1 | 6/2016 | Aspuru-Guzik et al. |
| 2016/0224515 A1 | 8/2016 | Ronagh et al. |
| 2016/0321559 A1 | 11/2016 | Rose et al. |
| 2016/0328253 A1 | 11/2016 | Majumdar |

(56) References Cited

U.S. PATENT DOCUMENTS

| | | | |
|---|---|---|---|
| 2016/0328659 A1 | 11/2016 | Mohseni et al. |
| 2016/0338075 A1 | 11/2016 | McKibben |
| 2016/0342891 A1 | 11/2016 | Ross et al. |
| 2017/0011305 A1 | 1/2017 | Williams |
| 2017/0017894 A1 | 1/2017 | Lanting et al. |
| 2017/0060642 A1 | 3/2017 | Castellano et al. |
| 2017/0109605 A1 | 4/2017 | Ahn |
| 2017/0147303 A1 | 5/2017 | Amy et al. |
| 2017/0147695 A1 | 5/2017 | Shih |
| 2017/0214701 A1 | 7/2017 | Hasan |
| 2017/0223143 A1 | 8/2017 | Johnson et al. |
| 2017/0242824 A1 | 8/2017 | Karimi et al. |
| 2017/0255592 A1 | 9/2017 | Karimi et al. |
| 2017/0255629 A1 | 9/2017 | Thom et al. |
| 2017/0255872 A1 | 9/2017 | Hamze et al. |
| 2017/0286852 A1 | 10/2017 | Rezaie et al. |
| 2017/0286858 A1 | 10/2017 | La et al. |
| 2017/0300808 A1 | 10/2017 | Ronagh et al. |
| 2017/0323195 A1 | 11/2017 | Crawford et al. |
| 2017/0344898 A1 | 11/2017 | Karimi et al. |
| 2017/0351974 A1 | 12/2017 | Rose et al. |
| 2017/0372427 A1 | 12/2017 | Johnson et al. |
| 2017/0373940 A1 | 12/2017 | Shahab et al. |
| 2018/0014970 A1 | 1/2018 | Conde De Paiva et al. |
| 2018/0039903 A1 | 2/2018 | Mosca et al. |
| 2018/0091440 A1 | 3/2018 | Dadashikelayeh et al. |
| 2018/0096085 A1 | 4/2018 | Rubin |
| 2018/0107526 A1 | 4/2018 | Dadashikelayeh et al. |
| 2018/0114138 A1 | 4/2018 | Monroe et al. |
| 2018/0204126 A1 | 7/2018 | Galle |
| 2018/0218279 A1 | 8/2018 | Lechner et al. |
| 2018/0218281 A1 | 8/2018 | Reinhardt et al. |
| 2018/0246851 A1 | 8/2018 | Zaribafiyan et al. |
| 2018/0260730 A1 | 9/2018 | Reagor et al. |
| 2018/0267937 A1 | 9/2018 | Pelc et al. |
| 2018/0308007 A1 | 10/2018 | Amin et al. |
| 2018/0314970 A1 | 11/2018 | Harris et al. |
| 2019/0009581 A1 | 1/2019 | Schalk et al. |
| 2019/0095811 A1 | 3/2019 | Antonio et al. |
| 2019/0205790 A1 | 7/2019 | Dukatz et al. |
| 2019/0378047 A1 | 12/2019 | Pistoia et al. |
| 2020/0005186 A1 | 1/2020 | Romero et al. |
| 2020/0057957 A1 | 2/2020 | Johnson et al. |
| 2020/0090072 A1 | 3/2020 | Troyer et al. |
| 2020/0104740 A1 | 4/2020 | Cao |
| 2020/0125568 A1 | 4/2020 | Idicula et al. |
| 2020/0143910 A1 | 5/2020 | Noori et al. |
| 2020/0191943 A1 | 6/2020 | Wu et al. |
| 2020/0272684 A1 | 8/2020 | Karimi et al. |
| 2020/0279187 A1 | 9/2020 | Huang et al. |
| 2020/0364597 A1 | 11/2020 | Friedlander et al. |
| 2020/0364601 A1 | 11/2020 | Yamazaki et al. |
| 2020/0394537 A1 | 12/2020 | Wang et al. |
| 2020/0410343 A1 | 12/2020 | Niu et al. |
| 2021/0103847 A1 | 4/2021 | Akzam |
| 2021/0166133 A1 | 6/2021 | Ronagh et al. |
| 2021/0166148 A1 | 6/2021 | Matsuura et al. |
| 2021/0279260 A1 | 9/2021 | Oberoi et al. |
| 2021/0287124 A1 | 9/2021 | Ronagh et al. |
| 2021/0374611 A1 | 12/2021 | Ronagh et al. |
| 2022/0107927 A1 | 4/2022 | Vedaie et al. |
| 2023/0077665 A1 | 3/2023 | Kuttimalai et al. |
| 2023/0104058 A1 | 4/2023 | Hopfmueller et al. |

FOREIGN PATENT DOCUMENTS

| | | | |
|---|---|---|---|
| CA | 2902015 A1 | 1/2016 |
| CA | 2921711 A1 | 8/2017 |
| CA | 3026824 A1 | 12/2017 |
| CN | 106874506 A | 6/2017 |
| CN | 110069348 A | 7/2019 |
| EP | 3113084 A1 | 1/2017 |
| JP | 2004503011 A | 1/2004 |
| JP | 2006061926 A | 3/2006 |
| JP | 2008525873 A | 7/2008 |
| JP | 2013114366 A | 6/2013 |
| JP | 2016206795 A | 12/2016 |
| WO | WO-2005122052 A1 | 12/2005 |
| WO | WO-2006026985 A2 | 3/2006 |
| WO | WO-2007089674 A2 | 8/2007 |
| WO | WO-2007147243 A1 | 12/2007 |
| WO | WO-2010148120 A2 | 12/2010 |
| WO | WO-2013006836 A1 | 1/2013 |
| WO | WO-2014210368 A1 | 12/2014 |
| WO | WO-2015006494 A1 | 1/2015 |
| WO | WO-2015060915 A2 | 4/2015 |
| WO | WO-2015121619 A2 | 8/2015 |
| WO | WO-2016029172 A1 | 2/2016 |
| WO | WO-2017033326 A1 | 3/2017 |
| WO | WO-2017068228 A1 | 4/2017 |
| WO | WO-2017111937 A1 | 6/2017 |
| WO | WO-2017145086 A1 | 8/2017 |
| WO | WO-2017149491 A1 | 9/2017 |
| WO | WO-2017152289 A1 | 9/2017 |
| WO | WO-2017168865 A1 | 10/2017 |
| WO | WO-2017201626 A1 | 11/2017 |
| WO | WO-2017214717 A1 | 12/2017 |
| WO | WO-2018119522 A1 | 7/2018 |
| WO | WO-2018160599 A1 | 9/2018 |
| WO | WO-2019104440 A1 | 6/2019 |
| WO | WO-2019104443 A1 | 6/2019 |
| WO | WO-2019152020 A1 | 8/2019 |
| WO | WO-2019157228 A1 | 8/2019 |
| WO | WO-2019222748 A1 | 11/2019 |
| WO | WO-2019241879 A1 | 12/2019 |
| WO | WO-2019244105 A1 | 12/2019 |
| WO | WO-2020113339 A1 | 6/2020 |
| WO | WO-2020223718 A1 | 11/2020 |
| WO | WO-2020227825 A1 | 11/2020 |
| WO | WO-2020255076 A1 | 12/2020 |
| WO | WO-2021055000 A1 | 3/2021 |
| WO | WO-2021111368 A1 | 6/2021 |
| WO | WO-2021181281 A1 | 9/2021 |
| WO | WO-2021207847 A1 | 10/2021 |
| WO | WO-2021237350 A1 | 12/2021 |
| WO | WO-2021243454 A1 | 12/2021 |
| WO | WO-2022079640 A1 | 4/2022 |
| WO | WO-2022123494 A1 | 6/2022 |
| WO | WO-2022224143 A1 | 10/2022 |
| WO | WO-2023275825 A1 | 1/2023 |
| WO | WO-2023053035 A1 | 4/2023 |

OTHER PUBLICATIONS

Akama et al. Implementation of divide-and-conquer method including Hartree-Fock exchange interaction. J Comput Chem 28(12):2003-2012 (2007).

Alidaee et al. Solving the maximum edge weight clique problem via unconstrained quadratic programming. European Journal of Operational Research 181(2):592-597 (2007).

Amelio et al.: Community mining in signed networks: A multiobjective approach. ASONAM 2013: Proceedings of the 2013 IEEE/ACM International Conference on Advances in Social Networks Analysis and Mining, pp. 95-99 https://doi.org/10.1145/2492517.2492641 (2013).

Amin et al.: Quantum Boltzmann Machine. arXiv reprint arXiv:1601.02036 [1-10] 2016.

Anchuri et al.: Communities and balance in signed networks: A spectral approach. In Proceedings of the 2012 International Conference on Advances in Social Networks Analysis and Mining (ASONAM 2012), ASONAM 2012, pp. 235-242, Washington, DC, USA (2012).

Anthony et al. Quadratization of symmetric pseudo-Boolean functions. Discrete Appl. Math. 203:1-12 (2016).

Aspuru-Guzik et al. Simulated Quantum Computation of Molecular Energies. Science 309:1704 (2005).

Assad et al. The quadratic minimum spanning tree problem. Naval Research Logistics 39:399-417 (1992).

Babbush et al. Resource Efficient Gadgets for Compiling Adiabatic Quantum Optimization Problems. arXiv:1307.8041v1 [quant-ph] (pp. 1-11) (Jul. 2013) Retrieved from the Internet: (https://arxiv.org/pdf/1307.8041.pdf5 ).

(56) References Cited

OTHER PUBLICATIONS

Babbush. Towards Viable Quantum Computation for Chemistry, 2015, [Retrieved on Feb. 27, 2020]. Retrieved from the internet: <url: https://pdfs.sennanticscholar.org/aff0/5ecf5f58c2206c923b767d76bed7f43b2a66.pdf? ga=2.2412147.276222377.1582743768639821531.1551220934 376 Pages (1376) (2015) .</url:>.
Barends et al. Digitized adiabatic quantum computing with a superconducting circuit. Nature 534(7606):222-226 (2016).
Bartak et al. Constraint Satisfaction Techniques for Planning and Scheduling Problems (Coplas-15), Jul. 6, 2015. Retrieved on Nov. 17, 2019 at https://www.cs.bgu.ac.il/-icapsI5/workshops/Proceedings %2000PLAS%202015.pdf (pp. 1-41) (2015).
Beasley. Integer programming solution methods. Available at URL: http://people.brunel.ac.uk/-mastjjb/jeb/natcor_ip_rest.pdf (20 pgs.) (2011).
Berry et al. Simulating Hamiltonian dynamics with a truncated Taylor series. Phys Rev Lett 114(9):090502 (2015).
Bertoni et al. Quantum logic gates based on coherent electron transport in quantum wires. Physical Review Letters 84(25):5912 (2000).
Bhagat et al.: Node Classification in Social Networks. arXiv:1101.3291v1 Social Network Data Analytics, pp. 115-148 (2011).
Bian et al. The Ising model: teaching an old problem new tricks. D-Wave Systems 2 (32 pgs.) (2010).
Bojchevski et al.: Deep Gaussian Embedding of Graphs: Unsupervised Inductive Learning via Ranking. arXiv.org, Cornell University, arXiv:1707.03815v4 [stat.ML], pp. 1-13 (2018).
Bombin, et al. Topological quantum distillation. Phys Rev Lett. Nov. 3, 2006;97(18):180501. doi: 10.1103/PhysRevLett.97.180501. Epub Oct. 30, 2006.
Boros et al. On quadratization of pseudo-Boolean functions. arXiv:1404.6538v1 [math.OC] (11 pgs.) (2014).
Boros et al. Pseudo-boolean optimization. Discrete Applied Mathematics 123(1):155-225 (2002).
Bravyi et al. Fermionic quantum computation. arXiv:quant-ph/0003137 (2000).
Bromley et al.: Applications of near-term photonic quantum computers: software and algorithms. Quantum Science and Technology 5:034010DOI:10.1088/2058-9565/ab8504 arXiv:1912.07634 [1-36] (2019).
Burell: An Introduction to Quantum Computing using Cavity QED concepts. arXiv preprint arXiv:1210.6512 (2012).
Byrnes et al. Macroscopic quantum computation using Bose-Einstein condensates. arXiv preprint quantum-ph/1103.5512 (2011).
Cai et al. A practical heuristic for finding graph minors.arXiv:1406.2741 [quant-ph] (16 pgs) (2014).
Cai et al.: A survey on network community detection based on evolutionary computation. International Journal of Bio-Inspired Computation 8(2):84-98 (2016).
Cao et al.: Advances in Knowledge Discovery and Data Mining. Springer International, pp. 82-95 (2015).
Carleo et al.: Constructing exact representations of quantum many-body systems with deep neural networks. Nat Commun. 9(1):5322, pp. 1-11 doi:10.1038/s41467-018-07520-3 (2018).
Carleo et al.: Solving the quantum many-body problem with artificial neural networks. pre-print arXiv:1606.02318 Science 355(6325):602-606 doi:10.1126/science.aag2302 (2016).
Carrasquilla et al.: Reconstructing quantum states with generative models. arXiv:1810.10584 Nature Machine Intelligence 1(3):155-161 arXiv:1810.10584 (2019).
Carrasquilla. Machine learning for quantum matter. https://arxiv.org/pdf/2003.11040.pdf (2020).
Chen et al.: Community Detection via Maximization of Modularity and Its Variants. IEEE Transactions on Computational Social Systems 1(1):46-65 DOI:10.1109/TCSS.2014.2307458 (2014).
Chen et al.: Epidemic spreading on networks with overlapping community structure. Physica A: Statistical Mechanics and its Applications 391(4):1848-1854 (2012).

Chiang et al.: Exploiting longer cycles for link prediction in signed networks. In Proceedings of the 20th ACM International Conference on Information and Knowledge Management, CIKM 2011, pp. 1157-1162, New York, NY, USA [1-6] (2011).
Choi. Minor-embedding in adiabatic quantum computation: I. The parameter setting problem. Quantum Information Processing 7(5):193-209 (2008).
Chowdhury et al.: Quantum algorithms for Gibbs sampling and hitting-time estimation. arXiv:1603.02940 Quant. Inf. Comp. 17(1-2):41-64 (2017).
Chuang et al.: Experimental implementation of fast quantum searching. Physical Review Letters 80(15):3408-3411 DOI:10.1103/PhysRevLett.80.3408 (1998).
Clarke et al. Superconducting quantum bits. Nature 453(7198):1031 (2008).
Conforti et al.: Integer Programming: Graduate Texts in Mathematics 271. Springer [1-466] (2014).
Conway et al. An FPGA-based instrumentation platform for use at deep cryogenic temperatures. arxiv.org/abs/1509.06809 (2015).
Co-pending U.S. Appl. No. 17/820,301, inventors Dadashikelayeh; Majid et al., filed Aug. 17, 2022.
Cory et al. Nuclear magnetic resonance spectroscopy: An experimentally accessible paradigm for quantum computing. arXiv preprint quant-ph/97090 01(1997).
Cowtan et al. On the qubit routing problem. arXiv:1902.08091v2 (2019).
Cramer et al. Efficient quantum state tomography, Nature Communications 1:149 (2010).
Debnath et al.: Demonstration of a small programmable quantum computer with atomic qubits. arXiv:1603.04512 Nature 536(7614):63-66 doi:10.1038/nature18648 (2016).
Deutsch et al. Quantum computing with neutral atoms in an optical lattice. arXiv preprint quant-ph/0003022 Fortschritte der Physik Progress of Physics; Oct. 2000, vol. 48, No. 9-11, pp. 925-943 (2000).
Durr et al. A Quantum Algorithm for Finding the Minimum. arXiv:quant-ph/9607014 (1996).
Dwave, Reverse Quantum Annealing for Local Refinement of Solutions, D-Wave Whitepaper Series, 2017-11-09. Retrieved online on Aug. 14, 2019 from https://www.dwavesys.com/sites/default/files/14-1018A-A_Reverse_Quantum_Annealing_for_Local_Refinement_Of_Solutions.pdf (2 pgs.).
Elvira et al.: Efficient Multiple Importance Sampling Estimators. pre-print arxiv.org/pdf/1505.05391, pp. 1-7 (2015).
EP17812349.3 Third Party Observations dated Oct. 29, 2020.
Esmailian et al.: Mesoscopic analysis of online social networks: The role of negative ties. arXiv:1411.6057v1 Phys. Rev. E90:042817, pp. 1-13 (2014).
Farhi et al. A Quantum Approximate Optimization Algorithm. arXiv:1411.4028 (2014).
Farhi et al. Quantum Adiabatic Evolution Algorithms versus Simulated Annealing.arXiv.org:quant ph/0201031 pp. 1-16 (2002).
Farhi et al. Quantum computation by adiabatic evolution. arXiv preprint quant-ph/0001106 (24 pgs) (2000).
Fedichkin et al. Novel coherent quantum bit using spatial quantization levels in semiconductor quantum dot. arXiv preprint quant-ph/0006097 (2000).
Fedorov et al. Exploring chemistry with the fragment molecular orbital method. Physical Chemistry Chemical Physics 14:7562-7577 (2012).
Ferrara et al.: Detecting criminal organizations in mobile phone networks. arXiv:1404.1295v1 Expert Systems with Applications 41(13):5733-5750 (2014).
Fortunato: Community detection in graphs. arXiv.org, Cornell University, arXiv:0906.0612v1 [physics.soc-ph], pp. 1-89 (2009).
Fowler, A.G. Minimum weight perfect matching in O (1) parallel time. arXiv 1307 (2013).
Freund. Applied Lagrange Duality for Constrained Optimization. Massachusetts Institute of Technology (pp. 1-35) (2004).
Gelman et al.: Simulating normalizing constants: from importance sampling to bridge sampling to path sampling. Statist. Sci. 13(2):163-185 DOI:10.1214/ss/1028905934 (1998).

(56) References Cited

OTHER PUBLICATIONS

Geoffrion. Lagrangean relaxation for integer programming. Mathematics Programming Study 2, North-Holland Publishing Company (pp. 1-34) (1974).
Gheorghiu, V. Standard form of qudit stabilizer groups. arXiv preprint arXiv:1101.1519 (2011).
Glover et al. Polynomial unconstrained binary optimisation Part 1, 2011, [Retrieved on Feb. 27, 2020]. Retrieved from the internet: <url: http://leedsfaculty.colorado.edu/glover/fred%20pubs/424%20% 20%20Polynonnial 25 Pages (231256) (2011) .</url:>.
Glover et al.: Tabu Search: Modern Heuristic Techniques for Combinatorial Problems. Colin R. Reeves (Ed.) Black Scientific Publications, Oxford [1-62] (1993).
Glover: Tabu search—part II. ORSA Journal on computing 2(1):4-32.1 4-32 DOI:10.1287/ijoc.2.1.4 (1990).
Gottesman, D. An Introduction to Quantum Error Correction and Fault-Tolerant Quantum Computation. arXiv preprint arXiv:0904.2557 (2009).
Greene et al. Simulated annealing without rejected moves. IEEE Transactions on Computer-Aided Design of Integrated Circuits and Systems 5(1):221-228 (1986).
Grover. A fast quantum mechanical algorithm for database search. Proceedings of the 28th Annual ACM Symposium on the Theory of Computing (pp. 212-219) (1996).
Gwennap: Groq Rocks Neural Networks. The Linley Group Microprocessor Report www.groq.com/groq-tsp-leads-in-inference-performance/ [1-5] (2020).
Hamilton et al.: Representation Learning on Graphs: Methods and Applications. arXiv.org, Cornell University, arXiv:1709.05584v3 [cs.SI], pp. 1-24 (2018).
Harneit. Spin Quantum Computing with Endohedral Fullerenes. arXiv preprint arXiv:1708.092 98 (2017).
He et al.: MISAGA: An Algorithm for Mining Interesting Subgraphs in Attributed Graphs. IEEE Transactions on Cybernetics 48(5):1369-1382 (2018).
Heider: Attitudes and cognitive organization. The Journal of Psychology 21(1):107-112 (1946).
Huang et al.: Predicting many properties of a quantum system from very few measurements. Nature Physics 16(10)1050-1057 doi:arxiv.org/abs/2002.08953 [1-40](2020).
Hukushima et al. Exchange Monte Carlo Method and Application to Spin Glass Simulations. Journal of the Physical Society of Japan 65:1604 (1996).
Humble et al.: Software Systems for High-performance Quantum Computing. IEEE Xplore doi:10.1109/HPEC.2016.7761628 [1-8](2016).
Imamoglu, et al. Quantum information processing using quantum dot spins and cavity QED. Physical review letters 83.20 (1999): 4204-4207.
Ishikawa. Transformation of General Binary MRF Minimization to the First-Order Case. IEEE Transactions on Pattern Analysis and Machine Intelligence. 33(6):1234-1249 (2011).
Izmaylov et al.: Revising the measurement process in the variational quantum eigensolver: is it possible to reduce the number of separately measured operators? Chem Sci. 10(13):3746- 3755 (2019).
Jiang, et al. Simulated annealing based influence maximization in social networks. Twenty-fifth AAAI conference on artificial intelligence (AAAI'11). AAAI Press, 127-132. (Year: 2011).
Johnson et al. Quantum annealing with manufactured spins. Nature 473(7346):194-198 (2011).
Jones et al.: Implementation of a quantum algorithm to solve Deutsch's problem on a nuclear magnetic resonance quantum computer. arXiv:quant-ph/9801027v2 The Journal of chemical physics, 109(5):1648-1653 DOI:10.1063/1.476739 (1998).
Jordan. Fast Quantum Algorithm for Numerical Gradient Estimation. Physical Review Letters 95:050501 (2015).
Kaminsky et al.: Scalable architecture for adiabatic quantum computing of NP-hard problems. Quantum Computing & Quantum Bits in Mesoscopic Systems, pp. 229-236 DOI:10.1007/978-1-4419-9092-1_25 [arXiv:quant-ph/0211152 1-10] (2004).
Kane. A silicon-based nuclear spin quantum computer. Nature 393(6681):133 (1998).
Karimi et al. A subgradient approach for constrained binary programming via quantum adiabatic evolution. arXiv preprint arXiv:1605.09462 (16 pgs.) (2016).
Karimi et al. Boosting quantum annealer performance via quantum persistence. Online publication eprint arXiv:1606.07797 (Jun. 27, 2027 and updated Aug. 30, 2016). Accessed May 17, 2017 and available from https://www.arxiv.org/pdf/1606.07797.pdf (25 pgs).
Karimi, et al. Practical integer-to-binary mapping for quantum annealers. Quantum Information Processing, vol. 18, No. 4, 94 (2019) DOI: 10.1007/s11128-019-2213-x.
Kassal et al.: Simulating chemistry using quantum computers. Annu Rev Phys Chem. 62:185-207 (2011).
Katzgraber et al. Seeking quantum speedup through spin glasses: the good, the bad, and the ugly. Physical Review 5(3):031026 (2015).
Kellerer et al. Knapsack Problems. Springer (15 pgs.) (2004).
Kempe et al.: The Complexity of the Local Hamiltonian Problem. SIAM Journal of Computing. 35(5):1070-1097 Rev.2008 DOI: arXiv:quant-ph/0406180v2 [1-30] (2005).
Kielpinski et al. Architecture for a large-scale ion-trap quantum computer. Nature 417(6890):709 (2002).
Kirkpatrick et al. Optimization by simulated annealing. Science 220:671-680 (1983).
Kitaura et al. Fragment molecular orbital method: an approximate computational method for large molecules. Chemical Physics Letters 313(3-4):701-706 (1999).
Knill et al. Efficient linear optics quantum computation. arXiv preprint quant-ph/0006088 (2000).
Knill, et al. Resilient Quantum Computation: Error Models and Thresholds. Proceedings of the Royal Society of London. Series A: Mathematical, Physical and Engineering Sciences 454.1969 (1998): 365-384.
Knizia et al. Density Matrix Embedding: A Simple Alternative to Dynamical Mean-Field Theory. Phys Rev Lett 109:186404 (2012).
Kobayashi et al. Chapter 5: Divide-and-conquer approaches to quantum chemistry: Theory and implementation, in Linear-Scaling Techniques in Computational Chemistry and Physics: Methods and Applications, edited by Zalesny et al. (Springer Netherlands, Dordrecht, 2011) pp. 97-127.
Kochenberger et al.: The unconstrained binary quadratic programming problem: A survey. J Comb Optim. 28(1)58-81 DOI:10.1007/s10878-014-9734-0 (2014).
Kokail et al. Self-verifying variational quantum simulation of lattice models. Nature 569(7756):355-360 (2019).
Konda et al. Actor-Critic Algorithms. Advances in Neural Information Processing Systems. pp. 1008-1014 (2000).
Kunegis et al.: The slashdot zoo: Mining a social network with negative edges. In Proceedings of the 18th International 20 Conference on World Wide Web, WWW 2009, pp. 741-750, New York, NY, USA DOI:10.1145/1526709.1526809 (2009).
Lemieux et al.: Efficient Quantum Walk Circuits for Metropolis-Hastings Algorithm. Quantum 4:287 [1-15] (2020).
Lemieux et al.: Resource estimate for quantum many-body ground-state preparation on a quantum computer. Physical Review A 103(5)052408 DOI:10.1103/PhysRevA. 103.052408 [1-9] (2021).
Lenstra: Integer programming with a fixed number of variables. 8(4):538-548 URL: https://doi.org/10.1287/moor.8.4.538 (1983).
Leskovec et al.: Empirical Comparison of Algorithms for Network Community Detection. Proceedings of International World Wide Web Conference 2010, Raleigh, North Carolina, USA, pp. 1-10 (2010).
Leskovec et al.: Predicting positive and negative links in online social networks. In Proceedings of the 19th International Conference on World Wide Web, WWW 2010, pp. 1-10, New York, NY, USA (2010).
Leuenberger et al. Quantum computing in molecular magnets. arXiv preprint cond-mat/0011415 (2001).
Levit et al. Free energy-based reinforcement learning using a quantum processor. Available at https://arxiv.org/pdf/1706.00074.pdf (May 2017) (8 pgs.).

(56) References Cited

OTHER PUBLICATIONS

Leyffer. Deterministic Methods for Mixed Integer Nonlinear Programming. University of Dundee (pp. 1-60 and pp. 1-58) (1993).
Li et al. Nonlinear Integer Programming. New York, NY (pp. 1-452) (2006).
Li: Tackling the Qubit Mapping Problem for NISQ-Era Quantum Devices. arXiv:1809.02573v2 Proceedings of the Twenty-Fourth International Conference on Architectural Support for Programming Languages and Operating Systems. (2019).
Liben-Nowell et al.: The link prediction problem for social networks. In Proceedings of the Twelfth International Conference on Information and Knowledge Management, CIKM 2003, pp. 556-559, New York, NY, USA [1-19](2004).
Lin et al.: Understanding community effects on information diffusion. Advances in Knowledge Discovery and Data Mining, pp. 82-95 DOI:10.1007/978-3-319-18038-0_7 (2015).
Low et al.: Hamiltonian simulation by Qubitization. arXiv:1610.06546v3 Quantum 3:163 URL:https://doi.org/10.22331/q-2019-07-12-163 [1-23] (2019).
Lu et al.: Demonstration of Shor's quantum factoring algorithm using photonic qubits. arXiv:0705.1684v3 Physical Review Letters 99(25):250504 DOI:10.1103/PhysRevLett.99.250504 [1-5] (2007).
Lu et al.: KKT Solution and Conic Relaxation for Solving Quadratically Constrained Quadratic Programming Problem. SIAM J. Optim. 21(4):1475-1490 DOI:10.1137/100793955 (2011).
Lu et al., Quantum chemistry simulation on quantum computers: theories and experiments. Physical Chemistry Chemical Physics 14(26):9411-9420 (2012).
Lyon. Spin-based quantum computing using electrons on liquid helium. arXiv preprint cond-mat/030158 1 (2006).
Martinis et al. Rabi oscillations in a large Josephson-junction qubit. Physical Review Letters 89:117901 (2002).
Marx et al. Chapter 1. Setting the stage: why ab initio molecular dynamics? In Ab Initio Molecular Dynamics: Basic Theory and Advanced Methods. Cambridge, UK Cambridge University Press (pp. 1-8) (2009).
Massa et al.: Controversial users demand local trust metrics: An experimental study on Epinions.com community. In Proceedings of the 20th National Conference on Artificial Intelligence AAA Press vol. 1, AAAI-05:121-126 (2005).
Matsuura et al. VanQver: The Variational and Adiabatically Navigated Quantum Eigensolver. New Journal of Physics 22:053023 (2020).
McClean et al. The Theory Of Variational Hybrid Quantum-Classical Algorithms, Institute of Physics. New Journal of Physics 18:023023. Retrieved online on Aug. 14, 2019 from https://iopscience.iop.org/article/10.1088/1367-2630/18/2/023023/ampdf (21 pgs) (2016).
McGeoch et al. Experimental Evaluation of an Adiabatic Quantum System for Combinatorial Optimization. Computing Frontiers. Proceeding CF '13 Proceedings of the ACM International Conference on Computing Frontiers. Article No. 23. Available at http://www.cs.amherst.edu/ccm/cf14-mcgeoch.pdf (11 pgs) (May 14-16, 2013).
McKiernan et al. Automated quantum programming via reinforcement learning for combinatorial optimization. Quantum Physics. arXiv.org quant-ph arXiv:1908.08054 (2019).
Medus et al.: Detection of community structures in networks via global optimization. Physica A: Statistical Mechanics and its Applications 358(2-4):593-604 DOI:10.1016/j.physa.2005.04.022 (2005).
Melko et al.: Restricted Boltzmann machines in quantum physics. Nature Physics 15(9):887-892 DOI:10.1038/s41567-019-0545-1 (2019).
Metz. IBM Is Now Letting Anyone Play With Its Quantum Computer. Wired. (5 pgs.) (May 2016).
Mnih et al. Asynchronous Methods for Deep Reinforcement Learning, in International Conference on Machine Learning, pp. 1928-1937 (2016).
Mnih et al. Playing Atari with Deep Reinforcement Learning. arXiv:1312.5602 (2013).
Moll et al., Optimizing qubit resources for quantum chemistry simulations in second quantization on quantum computer. Journal of Physics A: Mathematical and Theoretical 49(29):295301 (2016).
Moll et al.: Quantum optimization using variational algorithms on near-term quantum devices. Quantum Sci. Technol. 3 030503 [1-17] (2018).
Montanaro. Quantum walk speedup of backtracking algorithms. arXiv:1509.02374v2 [quant-ph] (23 pgs) (2015).
Monz et al.: Realization of a scalable Shor algorithm. arXiv:1507.08852 Science 351(6277):1068-1070 DOI:10.1126/science.aad9480 (2015).
Motzkin et al.: Maxima for graphs as a new proof of a theorem of Turan. Canadian Journal of Mathematics 17:533-540 DOI:10.4153/CJM-1965-053-6 (1965).
Nafradi et al. Room temperature manipulation of long lifetime spins in metallic-like carbon nanospheres. Nat Commun 7:12232 (2016).
Nagy et al.: Variational quantum Monte Carlo method with a neural-network ansatz for open quantum systems. Phys Rev Letters 122(25):250501 doi:arxiv.org/abs/1902.09483 [1-10](2019).
Nam et al.: Ground-state energy estimation of the water molecule on a trapped ion quantum computer. arXiv preprint arXiv:1902.10171, pp. 1-14 (2019).
Newman et al.: Finding and evaluating community structure in networks. Phys. Rev. E. 69:026113, pp. 1-16 (2004).
Newman: Modularity and community structure in networks. PNAS 103(23):8577-8582 (2006).
Nielsen, et al. Quantum Computation and Quantum Information. Chapter 10: Quantum error-correction. Cambridge University Press. pages 425-499. (2010).
Niklasson et al., Fast method for quantum mechanical molecular dynamics. Physical Review B 86(17):174308 (2012).
Nishikawa et al. Quantum Chemistry Grid/Gaussian Portal, Journal of the twenty second Annual Research Society, Japan Simulation Society, Jun. 18, 2003, pp. 369 to 372 (English Abstract).
Nizovtsev et al. A quantum computer based on NV centers in diamond: optically detected nutations of single electron and nuclear spins. Optics and spectroscopy 99(2):233-244 (2005).
O'Gorman et al. Compiling planning into quantum optimization problems: a comparative study. Proc. of the Workshop on Constraint Satisfaction Techniques for Planning and Scheduling Problems (COPLAS-15) (pp. 11-20) (Jun. 2015) Retrieved from the Internet: <https://www.cs.bgu.acilt—icaps15/workshops/Proceedings%2000PLAS%202015.pdf>.
Ohlsson et al. Quantum computer hardware based on rare-earth-ion-doped inorganic crystals. Optics Communications 201(1-3):71-77 (2002).
Olsson et al.: Solving Large Scale Binary Quadratic Problems: Spectral Methods vs. Semidefinite Programming. IEEE Conference on Computer Vision and Pattern Recognition, pp. 1-8, doi:10.1109/CVPR.2007.383202 (2007).
O'Malley et al. Scalable Quantum Simulation of Molecular Energies. Phys. Rev. X 6:031007 (2016).
Orus. Tensor networks for complex quantum systems. Nature Reviews Physics 1:538 (2019).
Papamakarios: Comparison of Modern Stochastic Optimization Algorithms. Scholar article. [1-13] (2014) www.richtarik.org/papers/Papamakarios.pdf.
Parekh, et al. Benchmarking adiabatic quantum optimization for complex network analysis. arXiv preprint arXiv: 1604.00319 (2016). (Year: 2016).
PCT/CA2017/050320 International Search Report and Written Opinion dated Jun. 27, 2017.
PCT/CA2017/050637 International Search Report and Written Opinion dated Aug. 25, 2017.
PCT/CA2017/050709 International Search Report and Written Opinion dated Sep. 19, 2017.
PCT/CA2017/051610 International Search Report and Written Opinion dated Mar. 21, 2018.
PCT/CA2018/051531 International Search Report and Written Opinion dated Feb. 20, 2019.
PCT/CA2018/051534 International Search Report and Written Opinion dated Feb. 21, 2019.
PCT/CA2019/050852 International Search Report and Written Opinion dated Aug. 15, 2019.
PCT/CA2019/051752 International Search Report and Written Opinion dated Mar. 17, 2020.

(56) References Cited

OTHER PUBLICATIONS

PCT/CA2020/050641 International Search Report and Written Opinion dated Jul. 21, 2020.
PCT/CA2021/050513 International Search Report and Written Opinion dated Jul. 14, 2021.
PCT/CA2021/050709 International Search Report and Written Opinion dated Aug. 3, 2021.
PCT/CA2021/050750 International Search Report and Written Opinion dated Aug. 6, 2021.
PCT/IB2017/051038 International Search Report dated May 16, 2017.
PCT/IB2017/051224 International Search Report dated May 18, 2017.
PCT/IB2019/055226 International Search Report and Written Opinion dated Nov. 26, 2019.
PCT/IB2020/055801 International Search Report and Written Opinion dated Oct. 30, 2020.
PCT/IB2020/061464 International Search Report and Written Opinion dated Mar. 4, 2021.
PCT/IB2021/051965 International Search Report and Written Opinion dated May 31, 2021.
PCT/IB2021/059421 International Search Report and Written Opinion dated Dec. 20, 2021.
PCT/IB2021/061527 International Search Report and Written Opinion dated Apr. 8, 2022.
PCT/IB2022/053658 International Search Report and Written Opinion dated Jun. 27, 2022.
PCT/IB2022/056124 International Search Report and Written Opinion dated Sep. 16, 2022.
Pedram, et al. Layout Optimization for Quantum Circuits with Linear Nearest Neighbor Architectures. IEEE Circuits and Systems Magazine 16 (2016): 62-74.
Peruzzo et al. A variational eigenvalue solver on a quantum processor. arXiv:1304.3061 (2013).
Pizzuti: A multi-objective genetic algorithm for community detection in networks. IEEE International Conference on Tools with Artificial Intelligence, pp. 379-386 DOI:10.1109/ICTAI.2009.58 (2009).
Poulin et al.: Sampling from the thermal quantum Gibbs state and evaluating partition functions with a quantum computer. arXiv:0905.2199 Physical Review Letters 103(22), pp. 1-7 DOI:10.1103/PhysRevLett.103.220502 (2009).
Preskill. Quantum Computing in the NISQ era and beyond. Quantum 2:79 arXiv:1801.00862 (2018).
Quek et al.: Adaptive Quantum State Tomography with Neural Networks. arXiv.org, Cornell University, arXiv:1812.06693v1 [quant-ph], pp. 1-13 pages (2018).
Reiher et al.: Elucidating reaction mechanisms on quantum computers. PNAS USA 114(29):7555-7560 (2017).
Ronagh et al. Solving constrained quadratic binary problems via quantum adiabatic evolution. arXiv preprint arXiv:1509.05001 (20 pgs.) (2015).
Rosenberg et al. Building an iterative heuristic solver for a quantum annealer. Computational Optimization and Applications 65:845 (2016).
Rubin: A Hybrid Classical/Quantum Approach for Large-Scale Studies of Quantum Systems with Density Matrix Embedding Theory. Cornell University Library, Ithaca, NY arXiv doi:arxiv.org/abs/1610.06910 [1-10](2016).
Salathe et al.: Dynamics and control of diseases in networks with community structure. PLOS Computational Biology 6(4):e1000736, pp. 1-11 (2010).
Schmidt et al. General Atomic and Molecular Electronic Structure System. Journal of Computational Chemistry 14:1347-1363 (1993).
Schollwock. The density-matrix renormalization group. Review of Modern Physics 77:259 arxiv.org:cond-mat/0409292 (2004).
Schuld et al., "Quantum machine learning in feature Hilbert spaces", Phys. Rev. Lett.; Feb. 1, 2019, vol. 122, pp. 040504-1-12.
Schulman et al. Proximal Policy Optimization Algorithms. arXiv:1707.06347 (2017).
Schwabl: Quantum Mechanics. Springer, 4th Ed. [1-425] (2007).
Sepehry, et al. Smooth Structured Prediction Using Quantum and Classical Gibbs Samplers. Oct. 1, 2018 (Oct. 1, 2018) Retrieved from the Internet: URL: https://arxiv.org/pdf/1809.04091v2.pdf [retrieved on Sep. 5, 2022].
Sepehry et al. Smooth Structured Prediction Using Quantum and Classical Gibbs Samplers. Available at https://1qbit.com/wp-content/uploads/2018/09/1QBit-Research-Paper-Smooth_Structured-Prediction-Using-Quantum-And_classical-Giobbs-Samplers.pdf (Accessed Feb. 20, 2018) (32 pgs).
Shapiro et al. A survey of Lagrangean techniques for discrete optimization. Operations Research Center, Massachusetts Institute of Technology, Cambridge, Massachusetts (pp. 1-18 and pp. 1-29) (May 1977).
Shen et al.: Quantum implementation of the unitary coupled cluster for simulating molecular electronic structure. Phys. Rev. A 95, 020501 (R) doi:10.1103/PhysRevA.95.020501 [1-6] (2017).
Siraichi et al. Qubit Allocation. CGO 2018—International Symposium on Code Generation and Optimization, Feb. 2018, Vienna, Austria (12 pgs) (2018). pp.1-12.
Sloss et al. Evolutionary Algorithms Review, arXiv:1906.08870 (2019).
Srinivas et al.: Muiltiobjective optimization using non-dominated sorting in genetic algorithms. Evolutionary Computation 2(3):221-248 (1994).
Sun et al. A single-photon switch and transistor enabled by a solid-state quantum memory. arXiv preprint quant-ph/1805.01964 (2018).
Suzuki. Fractal decomposition of exponential operators with applications to many-body theories and Monte Carlo simulations. Physics Letters A 146(6):319-323 (1990).
Svore et al. Toward a Software Architecture for Quantum Computing Design Tools. QPL 2004, pp. 127-144, Retrieved from the Internet: URL: https://www.microsoft.com/en-US/resear ch/wp-content/uploads/2016/02/10Svore-Cros s-Aho-Chuang-Markov.pdf.
SymPy Python. Internals of the Polynomial Manupulation Module. Available online at http://docs.sympy.org/latest/modules/polys/internals.html (Accessed Jun. 2016) (136 pgs).
Tang et al.: A Survey of Signed Network Mining in Social Media. ACM Computing Surveys 9(4):pp. 39:1 to 39:38, arXiv.org, Cornell University, arXiv:1511.07569v3 [cs.SI] (2016).
Tavares et al. New algorithms for Quadratic Unconstrained Binary Optimization (QUBO) with applications in engineering and social sciences. Rutgers University Community Repository. Dissertation—Retrieved from the Internet <URL: https://rucorelibrariessutgers.edu/rutgers-lib/25771/> on Feb. 2, 2018 (460 pgs) ( May 2008).
Temme et al.: Quantum metropolis sampling. Nature 471(7336):87-90 (2011).
Terhal et al.: The problem of equilibration and the computation of correlation functions on a quantum computer. arXiv:quant-ph/9810063 Phys.Rev. A61:22301, pp. 1-35 DOI:10.1103/PhysRevA.61.022301 (2000).
The D-Wave 2X™ Quantum Computer Technology Overview (12 pgs) (2015).
The D-Wave Quantum Computer. Brochure. D-Wave Systems Inc. 2016. www.dwavesys.com.
Torlai et al.: Neural-network quantum state tomography. pre-print arXiv:1703.05334v2 Nature Physics 14:447-450 DOI:10.1038/s41567-018-0048-5 (2017).
Tran et al. A hybrid quantum-classical approach to solving scheduling problems. AAAI Publications, Ninth Annual Symposium on Combinatorial Search. pp. 98-106 (SoCS 2016).
Tran et al. Explorations of Quantum-Classical Approaches to Scheduling a MarsLander Activity Problem. The Workshops of the Thirtieth AAAI Conference on Artificial Intelligence Planning for Hybrid Systems: Technical Report WS-16-12, p. 641-649, published on Mar. 29, 2016.
Trotter. On the product of semi-groups of operators. Proceedings of the American Mathematical Society 10(4):545-551 (1959).
U.S. Appl. No. 16/811,479 Non-Final Office Action dated Aug. 30, 2021.
U.S. Appl. No. 15/014,576 Office Action dated Dec. 26, 2017.

(56) References Cited

OTHER PUBLICATIONS

U.S. Appl. No. 15/014,576 Office Action dated Jul. 10, 2017.
U.S. Appl. No. 15/051,271 Office Action dated Mar. 13, 2018.
U.S. Appl. No. 15/051,271 Office Action dated Nov. 24, 2017.
U.S. Appl. No. 15/165,655 1st Action Interview dated Feb. 24, 2017.
U.S. Appl. No. 15/165,655 1st Action Interview dated Oct. 25, 2016.
U.S. Appl. No. 15/165,655 Office Action dated Jun. 2, 2017.
U.S. Appl. No. 15/486,960 Office Action dated Jun. 22, 2017.
U.S. Appl. No. 15/830,953 Office Action dated Feb. 14, 2018.
U.S. Appl. No. 15/831,967 Office Action dated Feb. 27, 2018.
U.S. Appl. No. 15/900,643 Miscellaneous Communication re: Third Party Submission dated Dec. 14, 2018.
U.S. Appl. No. 15/900,643 Office Action dated Apr. 14, 2022.
U.S. Appl. No. 16/010,244 Miscellaneous Communication re: Third Party Submission dated Apr. 23, 2019.
U.S. Appl. No. 16/010,244 Office Action dated Dec. 2, 2019.
U.S. Appl. No. 16/010,244 Office Action dated Jun. 10, 2019.
U.S. Appl. No. 16/124,083 Miscellaneous Communication re: Third Party Submission dated Jul. 11, 2019.
U.S. Appl. No. 16/124,083 Office Action dated Jul. 18, 2019.
U.S. Appl. No. 16/124,083 Office Action dated Nov. 21, 2019.
U.S. Appl. No. 16/162,249 Miscellaneous Communication re: Third Party Submission dated May 2, 2019.
U.S. Appl. No. 16/162,249 Office Action dated Dec. 2, 2019.
U.S. Appl. No. 16/162,249 Office Action dated Jun. 12, 2019.
U.S. Appl. No. 16/811,479 Office Action dated Apr. 8, 2022.
U.S. Appl. No. 16/811,479 Office Action dated Sep. 22, 2022.
U.S. Appl. No. 16/888,446 3rd Party Submission dated Apr. 7, 2021.
U.S. Appl. No. 17/254,661 Office Action dated Mar. 18, 2022.
U.S. Appl. No. 17/254,661 Office Action dated Sep. 14, 2022.
Ushijima-Mwesigwa, et al. Graph Partitioning using Quantum Annealing on the D-Wave System. Proceedings of the Second International Workshop on Post Moores Era Supercomputing. 2017. (Year: 2017).
Van Dam et al. How powerful is adiabatic quantum computation Proceedings 42nd IEEE Symposium on Foundations of Computer Science (pp. 279-287) (Oct. 2001).
Vartiainen: Unitary Transformations for Quantum Computing. Doctoral Dissertation. Helsinki University of Technology TKK dissertations. DOI: aaltodoc.aalto.fi/handle/123456789/2551 [1-56] (2005).
Veis et al.: Quantum computing applied to calculations of molecular energies: CH2 benchmark. J Chem Phys. 133(19):194106 doi:10.1063/1.3503767 [1-29](2010).
Venuti et al.: Adiabaticity in open quantum systems. arXiv:1508.05558v2 Phys. Rev. A93(3):032118, pp. 1-12 DOI:10.1103/PhysRevA.93.032118 (2016).
Vinci et al. Quantum annealing correction with minor embedding. Physical Review A 92.4 (34 pgs) (Jul. 2015).
Wang et al. Population Annealing: Theory and Application in Spin Glasses. Physics Review E 92:961 (2015).
Waskiewicz: Friend of a friend influence in terrorist social networks. In Proceedings on the International Conference on Artificial Intelligence (ICAO, pp. 1-5. The Steering Committee of The World Congress in Computer Science, Computer Engineering and Applied Computing (WorldComp) (2012).
Wendin: Quantum information processing with superconducting circuits: a review. Rep Prog Phys. 80(10):106001 doi:10.1088/1361-6633/aa7e1a [1-50](2017).
White. Density Matrix Formulation for Quantum Renormalization Groups. Physical Review Letters 69:286 (1992).
Whitfield et al., Simulation of electronic structure Hamiltonians using quantum computers. Molecular Physics 109(5):735-750 (2011).
Wigner et al. Paulische equivalence ban. Magazine for physics 47:631 (1928) (English Abstract).
Wooters et al. The no-cloning theorem. Physics Today 62(2):76-77 (2009).
Wouters et al. A Practical Guide to Density Matrix Embedding Theory in Quantum Chemistry. J Chem Theory Comput. 12(6):2706-19 (2016).

Xu et al.: Neural network state estimation for full quantum state tomography. ArXiv preprint doi:arxiv.org/abs/1811.06654 [1-8] (2018).
Yang. Direct calculation of electron density in density-functional theory: Implementation for benzene and a tetrapeptide, Physical Review A 44:(11):7823-7826 (1991).
Zahedinejad et al.: Multi-Community Detection in Signed Graphs Using Quantum Hardware. arXiv.org, 1QBit online research paper, Cornell University, arXiv:1901.04873v1 [quant-ph], pp. 1-10 (2019).
Zimmerman et al. Strong Correlation in Incremental Full Configuration Interaction. Journal of Chemical Physics 146:224104 (2017).
Zulehner et al. Efficient mapping of quantum circuits to the IBM QX architectures. In Design, Automation & Test in Europe Conference & Exhibition 2018 38(7):1226-1236 (2018).
Aharonov, et al. Adiabatic quantum state generation and statistical zero knowledge. Proceedings of the thirty-fifth annual ACM symposium on Theory of computing. 2003. https://arxiv.org/abs/quant-ph/0301023.
An et al., "Quantum linear system solver based on time-optimal adiabatic quantum computing and quantum approximate optimization algorithm," 2019, arXiv preprint arXiv:1909.05500.
Boixo, et al., "Fast quantum algorithms for traversing paths of eigenstates," 2010, arXiv preprint arXiv:1005.3034, 36 pgs.
Boixo et al., "Quantum state preparation by phase randomization," 2009, arXiv preprint arXiv:0903.1652.
Brassard, et al., "An exact quantum polynomial-time algorithm for Simon's problem," Proceedings of the Fifth Israeli Symposium on Theory of Computing and Systems, IEEE, 1997; 12 pgs.
Chamberland et al., Triangular color codes on trivalent graphs with flag qubits. New J. Phys. Feb. 2020. Vol. 22 023019. 24 pages. https://doi.org/10.1088/1367-2630/ab68fd.
Co-pending U.S. Appl. No. 18/047,882, inventors Ronagh; Pooya et al., filed Oct. 19, 2022.
Co-pending U.S. Appl. No. 18/053,080, inventor Dadashikelayeh; Majid, filed Nov. 7, 2022.
Co-pending U.S. Appl. No. 18/189,390, inventors Dadashikelayeh; Majid et al., filed Mar. 24, 2023.
Co-pending U.S. Appl. No. 18/297,513, inventors ROSENBERG; Gilad Amir et al., filed Apr. 7, 2023.
Das et al., A Scalable Decoder Micro-architecture for Fault-Tolerant Quantum Computing. arXiv preprint arXiv:2001.06598 (2020).
Delfosse et al., Almost-linear time decoding algorithm for topological codes. Quantum 5 (2021): 595.
DelFosse et al., Toward a Union-Find decoder for quantum LDPC codes. IEEE Transactions on Information Theory 68.5 (2022): 3187-3199.
Fan, et al. Robust Optimization of Graph Partitioning and Critical Node Detection in Analyzing Networks. In Combinatorial Optimization and Applications—4th International Conference, COCOA 2010, Proceedings (PART 1 ed., pp. 170-183). (Year: 2010).
Fan, et al. Robust optimization of graph partitioning involving interval uncertainty. Theoretical Computer Science. 447 (2012): 53-61.
Glover et al. Tabu Search. Handbook of Combinatorial Optimization, Du DZ., Pardalos P.M. (eds), Springer, Boston, MA, 1998; 94 pgs.
Han et al., "Approximate computing: An emerging paradigm for energy-efficient design," 18th IEEE European Test Symposium (ETS), IEEE, 2013; https://ieeexplore.IEEE.org/document/6569370.
Hennessy, et al. Computer Architecture: A Quantitative Approach. Elsevier Science & Technology, 2014. ProQuest Ebook Central, https://ebookcentral.proquest.com/lib/uspto-ebooks/detail.action?docID=404052 . (Year: 2014).
Huang et al., Fault-tolerant weighted union-find decoding on the toric code. Physical Review A 102.1 (2020): 012419.
Krol et al., "Efficient decomposition of unitary matrices in quantum circuit compilers," 2021, arXiv preprint arXiv:2101.02993, 13 pgs.
Kubica et al., Efficient color code decoders in d = 2 dimensions from toric code decoders. arXiv preprint arXiv:1905.07393 (2019).
Mao, et al. Artificial neural networks for feature extraction and multivariate data projection. IEEE Transactions on Neural Networks. vol. 6, No. 2, pp. 296-317, Mar. 1995, doi: 10.1109/72.363467.

(56) References Cited

OTHER PUBLICATIONS

PCT/IB2022/059253 International Search Report and Written Opinion dated Jan. 27, 2023.
Pedregosa, F. Hyperparameter optimization with approximate gradient. International conference on machine learning. PMLR, 2016.
Pillutla, et al. A Smoother Way to Train Structured Prediction Models. NIPS'18: Proceedings of the 32nd International Conference on Neural Information Processing Systems. Dec. 3, 2018. doi:10.48550/arxiv.1902.03228 Retrieved from the Internet: https://dl.acm.org/doi/pdf/10.5555/3327345.3327386.
Resende, et al. Grasp with path-relinking: Recent advances and applications. Metaheuristics: progress as real problem solvers (2005): 29-63.
Sakaguchi, et al. Boltzmann Sampling by Degenerate Optical Parametric Oscillator Network for Structure-Based Virtual Screening. Entropy. 2016; 18(10):365. https://doi.org/10.3390/e18100365.
Sefi, et al. How to decompose arbitrary continuous-variable quantum operations. Physical review letters 107.17 (2011): 170501.
U.S. Appl. No. 16/811,479 Office Action dated Feb. 14, 2023.
U.S. Appl. No. 16/888,419 Office Action dated Feb. 3, 2023.
U.S. Appl. No. 17/254,661 Office Action dated Mar. 22, 2023.
Wah, et al. Simulated Annealing with Asymptotic Convergence for Nonlinear Constrained Global Optimization. Principles and Practice of Constraint Programming—CP'99: 5th International Conference, CP'99, Alexandria, VA, USA, Oct. 11-14, 1999. Proceedings 5. Springer Berlin Heidelberg, 1999.
Wikipedia. Automatic Differentiation. Article from Nov. 23, 2016. https://en.wikipedia.org/w/index.php?title=Automatic_differentiation&oldid=751071969. Accessed Jan. 29, 2023. (Year: 2016).
Yanagimoto, et al. Engineering a Kerr-based Deterministic Cubic Phase Gate via Gaussian Operations. Physical Review Letters 124.24 (2020): 240503.

* cited by examiner

METHOD AND SYSTEM FOR SOLVING THE LAGRANGIAN DUAL OF A CONSTRAINED BINARY QUADRATIC PROGRAMMING PROBLEM USING A QUANTUM ANNEALER

CROSS-REFERENCE

The present patent application is a continuation-in-part of U.S. patent application Ser. No. 16/811,479, filed Mar. 6, 2020, which is a continuation of U.S. patent application Ser. No. 15/051,271, filed Feb. 23, 2016: the present application is also a continuation-in-part of U.S. Patent application Ser. No. 16/809,473, filed Mar. 4, 2020, now U.S. Pat. No. 11,514,134, which is a continuation of U.S. patent application Ser. No. 15/014,576, filed Feb. 3, 2016, which claims the benefit of Canadian Patent Application No. 2,881,033, filed on Feb. 3, 2015, each of which is incorporated herein by reference in its entirety.

FIELD

The invention relates to computing. More precisely, this invention pertains to a method and system for solving the Lagrangian dual problem corresponding to a binary quadratic programming problem.

BACKGROUND

In duality theory, several different types of dualization and dual problems are proposed. One type of dual problems are the Lagrangian dual problems. A thorough description of Lagrangian duality theory is disclosed in "Nonlinear integer programming" by Duan Li and Xiaoling Sun, which is incorporated herein by reference. For applications of Lagrangian techniques in discrete optimization, refer to "A survey of Lagrangian techniques for discrete optimization" by Jeremy F. Shapiro, Operations Research Center, Massachusetts Institute of Technology, Cambridge, Mass., and to "Lagrangian relaxation for integer programming" by A. M. Geoffrion, Mathematics Programming Study 2 (1974) 82-114, North-Holland Publishing Company, which are incorporated herein by reference.

There are several methods proposed for solving the Lagrangian dual problems, e.g., subgradient method, outer Lagrangian linearization method, and bundle method as disclosed in Chapter 3 of "Nonlinear integer programming" by Duan Li and Xiaoling Sun. The difficulty of having efficient implementations of such algorithms is the urge for efficient methods for solving hard nonlinear integer programming problems in various stages of these methods. For example, the single constrained quadratic 0-1 knapsack problem can be solved using an efficient branch and bound method based on Lagrangian duality as explained in Section 11.5 of "Nonlinear integer programming" by Duan Li and Xiaoling Sun, but the proposed method cannot be generalized for multi-dimensional knapsack problems.

There is a need for a method for solving a Lagrangian dual optimization problem that will overcome at least one of the above-identified drawback.

Features of the invention will be apparent from review of the disclosure, drawings and description of the invention below.

BRIEF SUMMARY

According to a broad aspect, there is disclosed a method for solving the Lagrangian dual of a binary polynomially constrained polynomial programming problem, the method comprising obtaining a binary polynomially constrained polynomial programming problem; until a convergence is detected, iteratively, providing a set of Lagrange multipliers, providing an unconstrained binary quadratic programming problem representative of the Lagrangian relaxation of the binary polynomially constrained polynomial programming problem at these Lagrange multipliers, providing the unconstrained binary quadratic programming problem to a quantum annealer, obtaining from the quantum annealer at least one corresponding solution, using the at least one corresponding solution to generate a new set of Lagrange multipliers; and providing all corresponding best-known primal-dual pairs of the Lagrangian dual of the binary polynomially constrained polynomial programming problem and best-known feasible solutions of the binary polynomially constrained polynomial programming problem after the convergence.

According to an embodiment, the obtaining of a binary polynomially constrained polynomial programming problem comprises obtaining data representative of a polynomial objective function; obtaining data representative of polynomial equality constraints; and obtaining data representative of polynomial inequality constraints.

According to an embodiment, the binary polynomially constrained polynomial programming problem is obtained from at least one of a user, a computer, a software package and an intelligent agent.

According to an embodiment, the obtaining of the binary polynomially constrained polynomial programming problem further comprises initializing software parameters and obtaining a step size subroutine.

According to an embodiment, the initializing of the software parameters comprises providing a generic degree reduced form of the generic Lagrangian relaxations of the binary polynomially constrained polynomial programming problem as a parameterized family of binary quadratic functions in the original and auxiliary variables, parameterized by the Lagrange multipliers. According to an embodiment, the initializing of the software parameters also comprises providing a generic embedding of the generic degree reduced forms of the generic Lagrangian relaxations of the binary polynomially constrained polynomial programming problem; providing an embedding solver function for providing a list of solutions; providing one of initial values and default values for Lagrange multipliers and providing an error tolerance value for the convergence criteria; providing an integer representative of a limit on the total number of iterations; and a limit on the total number of non-improving iterations.

According to an embodiment, an initial Lagrangian relaxation of the binary polynomially constrained polynomial programming problem is generated using the initial Lagrange multipliers.

According to an embodiment, the initial degree reduced form of the Lagrangian relaxation of the binary polynomially constrained polynomial programming problem is solved using the quantum annealer and at least one corresponding solution is obtained.

According to an embodiment, the at least one corresponding solution is used to generate a subgradient of the Lagrangian dual of the binary polynomially constrained polynomial programming problem.

According to an embodiment, the providing of a corresponding solution to the Lagrangian dual of the binary polynomially constrained polynomial programming problem comprises storing the corresponding solution in a file.

According to a broad aspect, there is disclosed a digital computer comprising a central processing unit; a display device; a communication port for operatively connecting the digital computer to a quantum annealer; a memory unit comprising an application for solving a Lagrangian dual of a binary polynomially constrained polynomial programming problem, the application comprising instructions for obtaining a binary polynomially constrained polynomial programming problem; instructions for iteratively providing a set of Lagrange multipliers, for providing an unconstrained binary quadratic programming problem representative of the Lagrangian relaxation of the binary polynomially constrained polynomial programming problem at these Lagrange multipliers, for providing the unconstrained quadratic programming problem to the quantum annealer using the communication port, for obtaining from the quantum annealer via the communication port at least one corresponding solution and for using the at least one corresponding solution to generate a new set of Lagrange multipliers until a convergence is detected; instructions for providing all corresponding best-known primal-dual pairs of the Lagrangian dual of the binary polynomially constrained polynomial programming problem and best-known feasible solutions of the binary polynomially constrained polynomial programming problem after the convergence is detected and a data bus for interconnecting the central processing unit, the display device, the communication port and the memory unit.

According to a broad aspect, there is disclosed a non-transitory computer-readable storage medium for storing computer-executable instructions which, when executed, cause a digital computer to perform a method for solving the Lagrangian dual of a binary polynomially constrained polynomial programming problem, the method comprising obtaining a binary polynomially constrained polynomial programming problem; until a convergence is detected, iteratively: providing a set of Lagrange multipliers, providing an unconstrained binary quadratic programming problem representative of a Lagrangian relaxation of the binary polynomially constrained polynomial programming problem at these Lagrange multipliers, providing the unconstrained binary quadratic programming problem to a quantum annealer, obtaining from the quantum annealer at least one corresponding solution, using the at least one corresponding solution to generate a new set of Lagrange multipliers; and providing all corresponding best-known primal-dual pairs of the Lagrangian dual of the binary polynomially constrained polynomial programming problem and best-known feasible solutions of the binary polynomially constrained polynomial programming problem after the convergence is detected.

According to a broad aspect, there is disclosed a method for solving a computational problem comprising a binary polynomially constrained polynomial programming problem, the method comprising: (a) providing, at a digital computer, said binary polynomially constrained polynomial programming problem; (b) using said digital computer to obtain an unconstrained binary quadratic programming problem representative of a discrete Lagrangian relaxation of said binary polynomially constrained polynomial programming problem at a set of Lagrange multipliers; (c) using said digital computer to direct said unconstrained binary quadratic programming problem to a binary optimizer over a communications network; (d) using said digital computer to obtain from said binary optimizer at least one solution corresponding to said unconstrained binary quadratic programming problem; (e) using said digital computer to generate at least one feasible solution of said binary polynomially constrained polynomial programming problem using said at least one solution corresponding to said unconstrained binary quadratic programming problem; and (f) using said digital computer to output a report indicative of said-said at least one feasible solution of said binary polynomially constrained polynomial programming problem.

According to an embodiment, said binary optimizer comprises a quantum computer. According to an embodiment, said binary optimizer comprises a quantum annealer.

According to an embodiment, the method further comprises using said digital computer to generate an updated set of Lagrange multipliers using a subgradient derived from said at least one solution to said unconstrained binary quadratic programming problem, wherein said subgradient is of a Lagrangian dual of said binary polynomially constrained polynomial programming problem. According to an embodiment, (a)-(d) and said using said digital computer to generate said updated set of Lagrange multipliers using said sub gradient are repeated at least once; and for each repetition said discrete Lagrangian relaxation of said binary polynomially constrained polynomial programming problem in (b) is at said updated set of Lagrange multipliers generated during a preceding iteration. According to an embodiment, (a)-(d) and said using said digital computer to generate said updated set of Lagrange multipliers using said subgradient are configured to be repeated until convergence is detected; and for each repetition said discrete Lagrangian relaxation of said binary polynomially constrained polynomial programming problem in (b) is at said updated set of Lagrange multipliers generated during a preceding iteration. According to an embodiment, (f) comprises providing corresponding best-known primal-dual pairs of said discrete Lagrangian dual of said binary polynomially constrained polynomial programming problem and best-known feasible solutions of said binary polynomially constrained polynomial programming problem after said convergence is detected.

According to an embodiment, (a) comprises: (i) obtaining data representative of a polynomial objective function; (ii) obtaining data representative of polynomial equality constraints; and (iii) obtaining data representative of polynomial inequality constraints. According to an embodiment, (i) comprises obtaining a set of Lagrange multipliers.

According to an embodiment, said binary polynomially constrained polynomial programming problem is configured to be provided by at least one of a user, a computer, a software package, and an intelligent agent.

According to an embodiment, (a) further comprises initializing software parameters and providing a step size subroutine. According to an embodiment, (b) further comprises providing a generic degree reduced form of generic discrete Lagrangian relaxations of said binary polynomially constrained polynomial programming problem as a parameterized family of binary quadratic functions in original and auxiliary variables, wherein said family is parameterized by Lagrange multipliers. According to an embodiment, the method further comprises (i) providing a generic embedding of generic degree reduced forms of said generic discrete Lagrangian relaxations of said binary polynomially constrained polynomial programming problem; (ii) providing an embedding solver function configured to provide a list of solutions; (iii) providing initial values or default values for said set of Lagrange multipliers; (iv) providing an error tolerance value for a convergence criteria; and (v) providing an integer representative of a limit on a total number of iterations and a limit on a total number of non-improving iterations.

According to an embodiment, the method further comprises generating an initial discrete Lagrangian relaxation of said binary polynomially constrained polynomial programming problem using an initial set of Lagrange multipliers. According to an embodiment, (f) comprises storing said report to a file.

According to a broad aspect, there is disclosed a system comprising a digital computer communicatively coupled to a binary optimizer through a communications network, wherein said digital computer is configured to: (i) provide a binary polynomially constrained polynomial programming problem; (ii) obtain an unconstrained binary quadratic programming problem representative of a discrete Lagrangian relaxation of said binary polynomially constrained polynomial programming problem at a set of Lagrange multipliers; and (iii) direct unconstrained binary quadratic programming problem to said binary optimizer over said communications network; (iv) obtain from said binary optimizer at least one solution corresponding to said unconstrained binary quadratic programming problem; (v) generate at least one feasible solution of said binary polynomially constrained polynomial programming problem using said at least one solution corresponding to said unconstrained binary quadratic programming problem; and (vi) output a report indicative of said at least one feasible solution of said binary polynomially constrained polynomial programming problem.

According to an embodiment, said binary optimizer comprises a quantum computer. According to an embodiment, said binary optimizer comprises a quantum annealer.

According to an embodiment, said digital computer is further configured to generate an updated set of Lagrange multipliers using a subgradient derived from said at least one solution to said unconstrained binary quadratic programming problem, wherein said subgradient is of a Lagrangian dual of said binary polynomially constrained polynomial programming problem. According to an embodiment, said digital computer is further configured to repeat (i)-(iv) and to generate said updated set of Lagrange multipliers using said subgradient at least once; and for each repetition said discrete Lagrangian relaxation of said binary polynomially constrained polynomial programming problem in (b) is at said updated set of Lagrange multipliers generated during a preceding iteration. According to an embodiment, said digital computer is further configured to repeat (i)-(iv) and to generate said updated set of Lagrange multipliers using said subgradient until convergence is detected; and for each repetition said discrete Lagrangian relaxation of said binary polynomially constrained polynomial programming problem in (b) is at said updated set of Lagrange multipliers generated during a preceding iteration. According to an embodiment, at (vi) said digital computer is configured to provide corresponding best-known primal-dual pairs of said discrete Lagrangian dual of said binary polynomially constrained polynomial programming problem and best-known feasible solutions of said binary polynomially constrained polynomial programming problem after said convergence is detected.

According to an embodiment, at (i) said digital computer is configured to: (A) obtain data representative of a polynomial objective function; (B) obtain data representative of polynomial equality constraints; and (C) obtain data representative of polynomial inequality constraints. According to an embodiment, at (A) said digital computer is configured to obtain a set of Lagrange multipliers.

According to an embodiment, said binary polynomially constrained polynomial programming problem is configured to be provided by at least one of a user, a computer, a software package and an intelligent agent.

According to an embodiment, at (i) said digital computer is configured to initialize software parameters and provide a step size subroutine. According to an embodiment, at (ii) said digital computer is configured to provide a generic degree reduced form of generic discrete Lagrangian relaxations of said binary polynomially constrained polynomial programming problem as a parameterized family of binary quadratic functions in original and auxiliary variables, wherein said family is parameterized by Lagrange multipliers. According to an embodiment, said digital computer is configured to: (A) provide a generic embedding of generic degree reduced forms of said generic discrete Lagrangian relaxations of said binary polynomially constrained polynomial programming problem; (B) provide an embedding solver function configured to provide a list of solutions; (C) provide initial values or default values for said set of Lagrange multipliers; (D) provide an error tolerance value for a convergence criteria; and (E) provide an integer representative of a limit on a total number of iterations and a limit on a total number of non-improving iterations. According to an embodiment, said digital computer is further configured to generate an initial discrete Lagrangian relaxation of said binary polynomially constrained polynomial programming problem using an initial set of Lagrange multipliers.

According to an embodiment, at (vi) said digital computer is configured to store said report to a file.

An advantage of the method disclosed herein for solving the Lagrangian dual of a binary polynomially constrained polynomial programming problem is that it is less sensitive to errors of the quantum systems. Those errors may be caused by noisy quantum bits used in some implementations of quantum annealers (e.g. D-Wave Systems).

Another advantage of the method disclosed herein is that it provides a method for using Lagrangian duality in various applications, for example finding Lagrangian based bounds to integer and mixed-integer programming problems using a quantum annealer.

Another advantage of the method disclosed herein is that it improves the processing of a system for solving a Lagrangian dual of a binary polynomially constrained polynomial programming problem.

BRIEF DESCRIPTION OF THE DRAWINGS

In order that the invention may be readily understood, embodiments of the invention are illustrated by way of example in the accompanying drawings.

Figure 1:
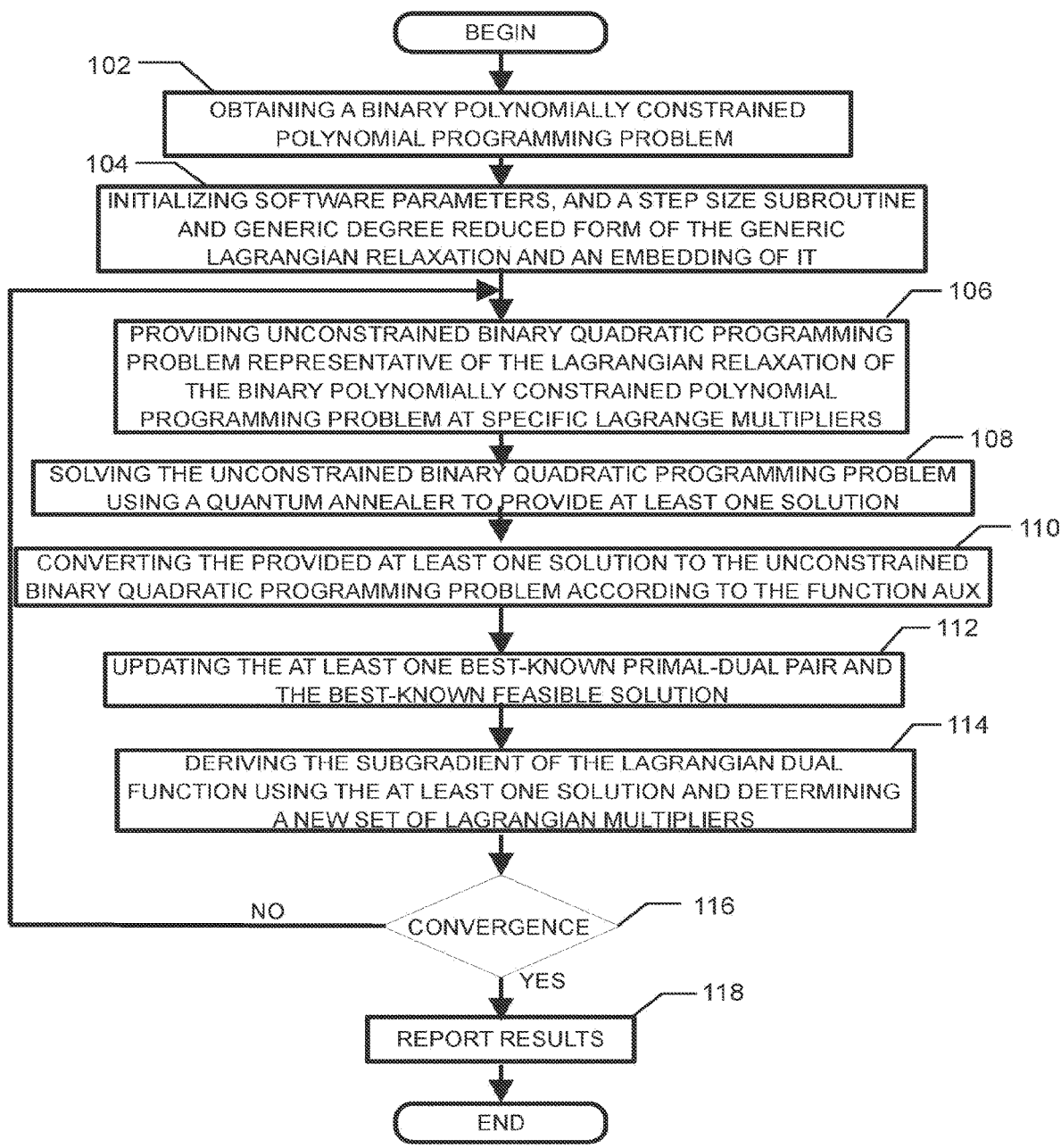
FIG. 1 is a flowchart that shows an embodiment of a method for solving a Lagrangian dual of a binary polynomially constrained polynomial programming problem using a quantum annealer.

Further details of the invention and its advantages will be apparent from the detailed description included below.

DETAILED DESCRIPTION

In the following description of the embodiments, references to the accompanying drawings are by way of illustration of an example by which the invention may be practiced.

Terms

The term "invention" and the like mean "the one or more inventions disclosed in this application," unless expressly specified otherwise.

The terms "an aspect," "an embodiment," "embodiment," "embodiments," "the embodiment," "the embodiments," "one or more embodiments," "some embodiments," "certain embodiments," "one embodiment," "another embodiment" and the like mean "one or more (but not all) embodiments of the disclosed invention(s)," unless expressly specified otherwise.

A reference to "another embodiment" or "another aspect" in describing an embodiment does not imply that the referenced embodiment is mutually exclusive with another embodiment (e.g., an embodiment described before the referenced embodiment), unless expressly specified otherwise.

The terms "including," "comprising" and variations thereof mean "including but not limited to," unless expressly specified otherwise.

The terms "a," "an", "the" and "at least one", mean "one or more," unless expressly specified otherwise.

The term "plurality" means "two or more," unless expressly specified otherwise.

The term "herein" means "in the present application, including anything which may be incorporated by reference," unless expressly specified otherwise.

The term "e.g." and like terms mean "for example," and thus does not limit the term or phrase it explains. For example, in a sentence "the computer sends data (e.g., instructions, a data structure) over the Internet," the term "e.g." explains that "instructions" are an example of "data" that the computer may send over the Internet, and also explains that "a data structure" is an example of "data" that the computer may send over the Internet. However, both "instructions" and "a data structure" are merely examples of "data," and other things besides "instructions" and "a data structure" can be "data."

The term "i.e." and like terms mean "that is," and thus limits the term or phrase it explains. For example, in the sentence "the computer sends data (i.e., instructions) over the Internet," the term "i.e." explains that "instructions" are the "data" that the computer sends over the Internet.

The term "binary polynomially constrained polynomial programming problem" and like terms mean finding the minimum of a real polynomial $y = f(x)$ in several binary variables $x=(x_1, \ldots, x_n)$ subject to a (possibly empty) family of equality constraints determined by a (possibly empty) family of m equations $g_j(x)=0$ for $j=1, \ldots, m$ and a (possibly empty) family of inequality constraints determined by a (possibly empty) family of l inequalities $h_j(x) \leq 0$ for $j=1, \ldots, l$. Here all functions $g_i$ and $h_j$ are polynomials.

min $f(x)$
subject to $g_i(x)=0 \ \forall i \in \{1, \ldots, m\}$
$h_j(x) \leq 0 \ \forall j \in \{1, \ldots, l\}$
$x_k \in \{0,1\} \ \forall k \in \{1, \ldots, n\}$ The term "domain" of the binary polynomially constrained polynomial programming problem, refers to the set $\{0,1\}^n$ of vectors of size n with binary entries. The term "feasible domain" of the binary polynomially constrained polynomial programming problem, refers to the subset $F \subseteq \{0,1\}^n$ of the domain consisting of all binary vectors $v \in \{0,1\}^n$ that satisfy all the m equality and l inequality constraints above.

The above binary polynomially constrained polynomial programming problem will be denoted by (P) and the optimal value of it will be denoted by v(P). An optimal solution x, i.e., a vector at which the objective function attains the value v(P) will be denoted by x*.

The term "Lagrangian function" of the binary polynomially constrained polynomial programming problem (P), means the following function:

$$L(x, \lambda, \mu) = f(x) + \sum_{i=1}^{m} \lambda_i g_i(x) + \sum_{j=1}^{\ell} \mu_j h_j(x)$$

The term "Lagrangian relaxation" of the binary polynomially constrained polynomial programming problem (P), corresponding to fixed Lagrange multipliers $\lambda \in \mathbb{R}^m$ and $\mu \in \mathbb{R}_{\geq 0}^{\ell}$, is defined as $$\delta_P(\lambda, \mu) = \min_{x \in \{0,1\}^n}\left( f(x) + \sum_{i=1}^{m} \lambda_i g_i(x) + \sum_{j=1}^{\ell} \mu_j h_j(x) \right)$$

The value of the above optimization, denoted as $\delta_P(\lambda, \mu)$ is known to be a lower bound for the optimal value of the original binary polynomially constrained polynomial programming, that is, $\delta_P(\lambda, \mu) \leq v(P)$.

The term "generic Lagrangian relaxation" of the binary polynomially constrained polynomial programming problem (P), means the parameterized family $\{L_{\lambda,\mu}(x)\}_{\{\lambda \in \mathbb{R}^m, \mu \in \mathbb{R}_{\geq 0}^{\ell}\}}$ of functions of x where for every choice of parameters $\bar{\lambda} \in \mathbb{R}^m$ and $\bar{\mu} \in \mathbb{R}_{\geq 0}^{\ell}$ we have $L_{\bar{\lambda},\bar{\mu}}(x) = L(x, \bar{\lambda}, \bar{\mu})$.

The term "Lagrangian dual" of a binary polynomially constrained polynomial programming problem, is used for the following optimization problem:

$$\max_{\lambda, \mu} \min_{x} \left( f(x) + \sum_{i=1}^{m} \lambda_i g_i(x) + \sum_{j=1}^{\ell} \mu_j h_j(x) \right)$$

subject to $x \in \{0,1\}^n$ $\lambda \in \mathbb{R}^m$ $\mu \in \mathbb{R}_{\geq 0}^l$ The value of the above optimization is denoted by $\delta(P)$ and is known to be a lower bound for the optimal value of the original binary polynomially constrained polynomial programming, that is, $\delta(P) \leq v(P)$. This value is unique and is also called the "Lagrangian dual bound" for the original binary polynomially constrained polynomial programming problem.

The term "optimal Lagrange multiplier," and the like, will refer to a, not necessarily unique, set of points $\lambda^*$ and $\mu^*$ at which the value $\delta(P)$ is attained in the above optimization problem.

The term "solution to the Lagrangian dual problem" of an original binary polynomially constrained polynomial programming problem, refers to the following collection of information received after solving the Lagrangian dual problem: (1) the Lagrangian dual bound; (2) a set of (not necessarily unique) optimal Lagrange multipliers as described above; and (3) a set of (not necessarily unique) binary vectors at which the optimal value of the Lagrangian dual problem is obtained at the given optimal Lagrange multipliers.

The term "primal-dual pair" refers to a vector $(\bar{x},\bar{\lambda},\bar{\mu})$ where $\bar{x}$ is representative of a (not necessarily unique) binary vector at which the optimal value of the Lagrangian relaxation corresponding to the Lagrange multipliers $(\bar{x},\bar{\lambda})$ is obtained.

The term "optimal primal-dual pair" refers to a primal-dual pair $(x^*, \lambda^*, \mu^*)$ for which $\delta_P(\lambda^*, \mu^*)$ attains the optimal value $\delta(P)$.

The term "best-known primal-dual pair" refers to a primal-dual pair $(x, \lambda, \mu)$ for which $\delta_P(\lambda, \mu)$ is the largest observed value of the function $\delta_P$ during a running process.

The term "best-known feasible solution" refers to a feasible vector i for which $f(\bar{x}^*)$ is the lowest amongst all observed feasible solutions of (P).

The term "quantum annealer" and like terms mean a system consisting of one or many types of hardware that can find the optimal or sub-optimal solutions to an unconstrained binary polynomial programming problem. An example of this is a system consisting of a digital computer embedding a binary polynomially constrained polynomial programming as an Ising spin model, attached to an analog computer that carries optimization of a configuration of spins in an !sing spin model using quantum annealing as described, for example, in Farhi, E. et al., "Quantum Adiabatic Evolution Algorithms versus Simulated Annealing" arXiv.org:quant ph/0201031 (2002), pp. 1-16. An embodiment of such analog computer is disclosed by McGeoch, Catherine C. and Cong Wang, (2013), "Experimental Evaluation of an Adiabatic Quantum System for Combinatorial Optimization" Computing Frontiers," May 14-16, 2013 (http://www.cs.amherst.edu/ccm/cf14-mcgeoch.pdf) and also disclosed in the Patent Application US 2006/0225165. It will be appreciated that the "quantum annealer" may also be comprised of "classical components," such as a classical computer. Accordingly, a "quantum annealer" may be entirely analog or an analog-classical hybrid.

The term "generic degree reduced form" of the generic Lagrangian relaxation of the binary polynomially constrained polynomial programming problem (P) refers to a parameterized family $\{q_{\lambda,\mu}(x,y)\}_{\{\lambda \in \mathbb{R}^m, \mu \in \mathbb{R}_{\geq 0}^l\}}$ of quadratic functions together with an assignment aux: $\{y_1, \ldots, y_t\} \to 2^{\{x_1, \ldots, x_n\}}$ of a subset of components of x to each component of y.

The term "embedding" of a binary optimization problem, and the like, refer to an assignment emb: $\{x_1, \ldots, x_n, y_1, \ldots, y_t\} \to 2^{\{q_1, \ldots, q_N\}}$ of a subset of all the quantum bits of the quantum annealer to each binary variable $x_i$ and each auxiliary variable $y_i$ such that the connectivities between the variables are respected by the connectivities of their images under emb. For examples, the subsets of qubits corresponding to two variable $x_r$ and $x_s$ should have a coupling between them in the quantum annealer if the term $x_r x_s$ appears in the generic degree reduced form of the generic Lagrangian relaxation of the binary polynomially constrained polynomial programming problem. Specifications of the role of such an embedding in solving an unconstrained binary polynomial programming problem and presentation of an efficient algorithm for it are disclosed, for instance, in "A practical heuristic for finding graph minors," Jun Cai, William G. Macready, Aidan Roy, in U.S. Patent Application US 2008/0218519 and in U.S. Pat. No. 8,655,828 B2.

The term "embedding solver," and the like, refer to a function, procedure, and algorithm that consist of instructions for receiving an unconstrained binary quadratic programming problem, carrying a query to the quantum annealer using a provided embedding, and returning at least one result, each result containing a vector of binary entries, representative of a binary point in the domain of the provided unconstrained binary quadratic programming, the value of the objective function of unconstrained binary quadratic programming at that point, and the number of occurrences of the result in the entire number of reads.

The term "subroutine" and the like, refer to a user-defined function, procedure, or algorithm that is called iteratively by the software throughout the run time. In the system disclosed herein, the step-size subroutine determines a next step-size for the iteration disclosed in FIG. 1. In the system disclosed herein, the embedding solver subroutine handles the queries to the quantum annealer provided an embedding.

The term "unconstrained binary quadratic programming problem" and like terms mean finding a minimum of an objective function $y = x^T Q x + b$ where Q is a symmetric real square matrix of size n, and b is a real number, also known as the bias of the objective function. The domain of the function is all vectors $x \in B^n = \{0,1\}^n$ with binary entries.

An important class of binary polynomially constrained polynomial programming problems is that of quadratically constrained ones. The term "binary quadratically constrained quadratic programming problem," and the like, refer to the class of binary polynomially constrained polynomial programming problems for which all functions $g_i$ and $h_j$ are linear or degree two polynomials. Hence the problem can be rewritten as min $f(x)$ subject to $A_{eq} = b_{eq}$ $A_{ineq} x \leq b_{ineq}$ $x^T A_{eq}^i x = b_{eq}^i \forall i \in \{1, \ldots, p\}$ $x^T A_{eq}^i x \leq b_{ineq}^i \forall i \in \{1, \ldots, q\}$ $x_i \in \{0,1\} \forall i \in \{1, \ldots, n\}$, where $y = f(x)$ is a quadratic polynomial of several binary variables $x = (x_1, \ldots, x_n)$ subject to a (possibly empty) family of linear equality constraints determined by a linear system $A_{eq} x = b_{eq}$ where $A_{eq}$ is a matrix of size m×n and $b_{eq}$ is a column matrix of size m×1 and a (possibly empty) family of inequality constraints determined by $A_{ineq} x \leq b_{ineq}$ where $A_{ineq}$ is a matrix of size l×n and $b_{ineq}$ is a column matrix of size l×1. Also subject to a (possibly empty) family of quadratic equality constraints determined by a set of p equations $x^t A_{eq}^i = b_{eq}^i$ where $A_{eq}^i$ is of size n×n and $b_{eq}^i$ is a real number for each i∈{1, ..., p}. Also subject to a (possibly empty) family of quadratic inequality constraints determined by a set of q inequalities $x^t A_{ineq}^i x \le b_{ineq}^i$ where $A_{ineq} t$ is of size n×n and $b_{ineq}^i$ is a real number for each i∈ {1, ..., q}.

Neither the Title nor the Abstract is to be taken as limiting in any way as the scope of the disclosed invention(s). The title of the present application and headings of sections provided in the present application are for convenience only, and are not to be taken as limiting the disclosure in any way.

Numerous embodiments are described in the present application and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural and logical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

It will be appreciated that the invention may be implemented in numerous ways, including a method, a system, a computer readable medium such as a computer readable storage medium. In this specification, these implementations, or any other form that the invention may take, may be referred to as systems or techniques. A component such as a processor or a memory described as being configured to perform a task includes both a general component that is temporarily configured to perform the task at a given time or a specific component that is manufactured to perform the task.

With all this in mind, the present invention is directed to a method and system for solving a Lagrangian dual of a binary polynomially constrained polynomial programming problem.

Figure 2:
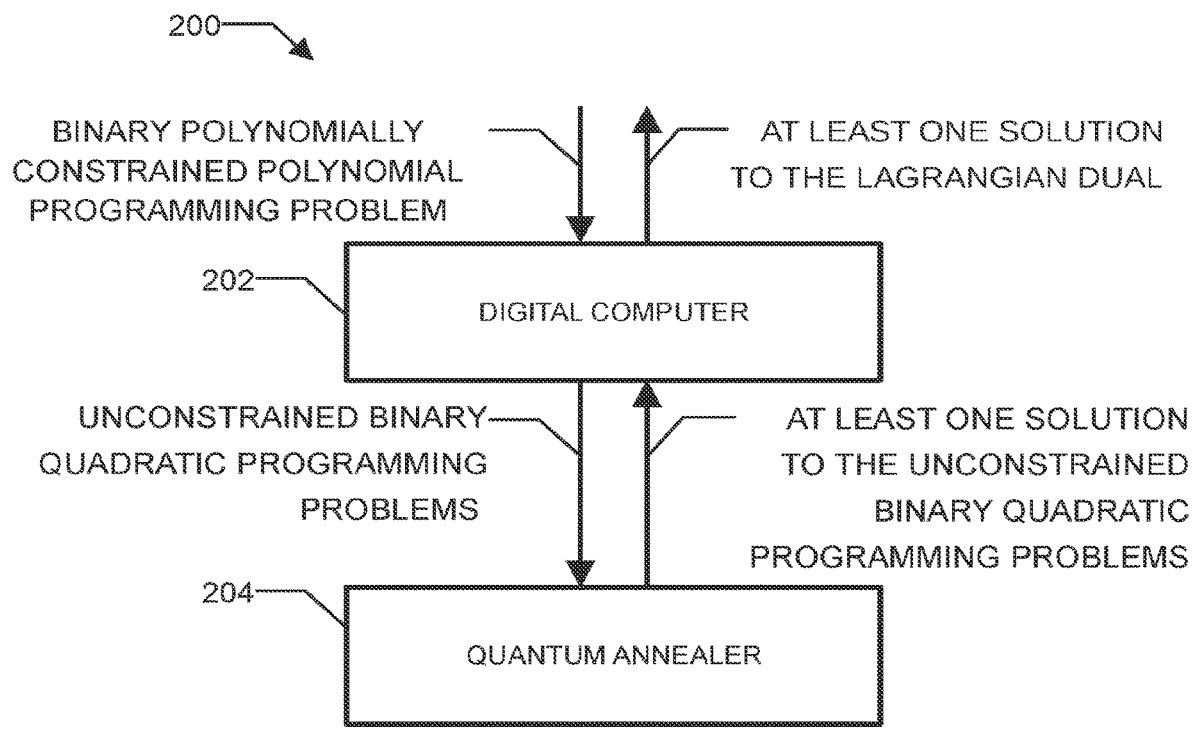
FIG. 2 is a diagram of an embodiment of a system in which the method for solving a Lagrangian dual of a binary polynomially constrained polynomial programming problem using a quantum annealer may be implemented. In this embodiment, the system comprises a digital computer and a quantum annealer.

Now referring to FIG. 2, there is shown an embodiment of a system 200 in which an embodiment of the method for solving a Lagrangian dual of a binary polynomially constrained polynomial programming problem may be implemented.

The system 200 comprises a digital computer 202 and a quantum annealer 204.

The digital computer 202 receives a binary polynomially constrained polynomial programming problem and provides at least one solution to the Lagrangian dual of the binary polynomially constrained polynomial programming problem.

It will be appreciated that the binary polynomially constrained polynomial programming problem may be provided according to various embodiments.

In one embodiment, the binary polynomially constrained polynomial programming problem is provided by a user interacting with the digital computer 202.

Alternatively, the binary polynomially constrained polynomial programming problem is provided by another computer, not shown, operatively connected to the digital computer 202.

Alternatively, the binary polynomially constrained polynomial programming problem is provided by an independent software package.

Alternatively, the binary polynomially constrained polynomial programming problem is provided by an intelligent agent.

Similarly, it will be appreciated that the at least one solution to the Lagrangian dual of the binary polynomially constrained polynomial programming problem may be provided according to various embodiments.

In accordance with an embodiment, the at least one solution to the Lagrangian dual of the binary polynomially constrained polynomial programming problem is provided to the user interacting with the digital computer 202.

Alternatively, the at least one solution to the Lagrangian dual of the binary polynomially constrained polynomial programming problem is provided to another computer operatively connected to the digital computer 202.

In fact, it will be appreciated by the skilled addressee that the digital computer 202 may be any type of computer.

In one embodiment, the digital computer 202 is selected from a group consisting of desktop computers, laptop computers, tablet PCs, servers, smartphones, etc.

Figure 3:
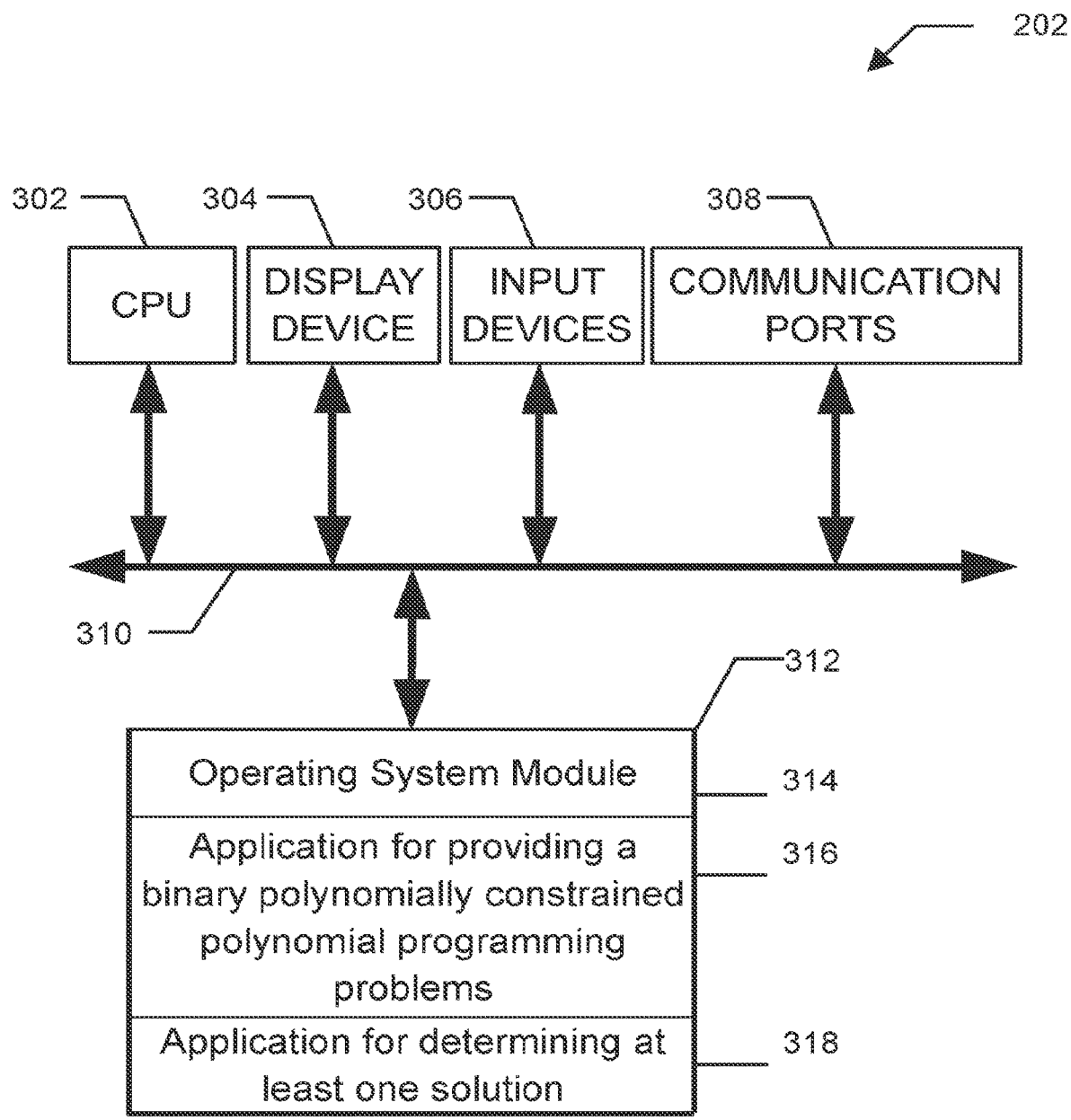
FIG. 3 is a diagram that shows an embodiment of a digital computer used in the system for solving a Lagrangian dual of a binary polynomially constrained polynomial programming problem using a quantum annealer.

Now referring to FIG. 3, there is shown an embodiment of a digital computer 202. It will be appreciated that the digital computer 202 may also be broadly referred to as a processor.

In this embodiment, the digital computer 202 comprises a central processing unit (CPU) 302, also referred to as a microprocessor, a display device 304, input devices 306, communication ports 308, a data bus 310 and a memory unit 312.

The CPU 302 is used for processing computer instructions. The skilled addressee will appreciate that various embodiments of the CPU 302 may be provided.

In one embodiment, the central processing unit 302 is a CPU Core i7-3820 running at 3.6 GHz and manufactured by Intel™

The display device 304 is used for displaying data to a user. The skilled addressee will appreciate that various types of display device 304 may be used.

In one embodiment, the display device 304 is a standard liquid-crystal display (LCD) monitor.

The communication ports 308 are used for sharing data with the digital computer 202.

The communication ports 308 may comprise, for instance, a universal serial bus (USB) port for connecting a keyboard and a mouse to the digital computer 202.

The communication ports 308 may further comprise a data network communication port such as an IEEE 802.3 port for enabling a connection of the digital computer 202 with another computer via a data network.

The skilled addressee will appreciate that various alternative embodiments of the communication ports 308 may be provided.

In one embodiment, the communication ports 308 comprise an Ethernet port and a mouse port (e.g., Logitech™).

The memory unit 312 is used for storing computer-executable instructions.

It will be appreciated that the memory unit 312 comprises, in one embodiment, an operating system module 314.

It will be appreciated by the skilled addressee that the operating system module 314 may be of various types.

In an embodiment, the operating system module 314 is Windows™ 8 manufactured by Microsoft™.

The memory unit 312 further comprises an application for solving the Lagrangian dual of a binary polynomially constrained polynomial programming problem 316.

The application 316 comprises instructions for obtaining a binary polynomially constrained polynomial programming problem.

The application 316 further comprises instructions for iteratively, providing a set of Lagrange multipliers, providing an unconstrained binary quadratic programming problem representative of the Lagrangian relaxation of the binary polynomially constrained polynomial programming problem at these Lagrange multipliers, providing the unconstrained binary quadratic programming problem to a quantum annealer; obtaining from the quantum annealer at least one corresponding solution and for using the at least one corresponding solution to generate a new set of Lagrange multipliers.

The application 316 further comprises instructions for providing a corresponding at least one solution to the Lagrangian dual of the binary polynomially constrained polynomial programming problem once a convergence is detected.

Each of the central processing unit 302, the display device 304, the input devices 306, the communication ports 308 and the memory unit 312 is interconnected via the data bus 310.

Now referring back to FIG. 2, it will be appreciated that the quantum annealer 204 is operatively connected to the digital computer 202.

It will be appreciated that the coupling of the quantum annealer 204 to the digital computer 202 may be achieved according to various embodiments.

In one embodiment, the coupling of the quantum annealer 204 to the digital computer 202 is achieved via a data network.

It will be appreciated that the quantum annealer 204 may be of various types.

In one embodiment, the quantum annealer 204 is manufactured by D-Wave Systems Inc. More information on this embodiment of a quantum annealer applicable to 204 may be found at http://www.dwavesys.com. The skilled addressee will appreciate that various alternative embodiments may be provided for the quantum annealer 204.

More precisely, the quantum annealer 204 receives an unconstrained binary quadratic programming problem from the digital computer 202.

The quantum annealer 204 is capable of solving the unconstrained binary quadratic programming problem and of providing at least one corresponding solution. In the case where a plurality of corresponding solutions is provided, the plurality of corresponding solutions may comprise optimal and suboptimal solutions.

The at least one corresponding solution is provided by the quantum annealer 204 to the digital computer 202.

Now referring to FIG. 1 and according to processing step 102, a binary polynomially constrained polynomial programming problem is obtained.

Figure 4:
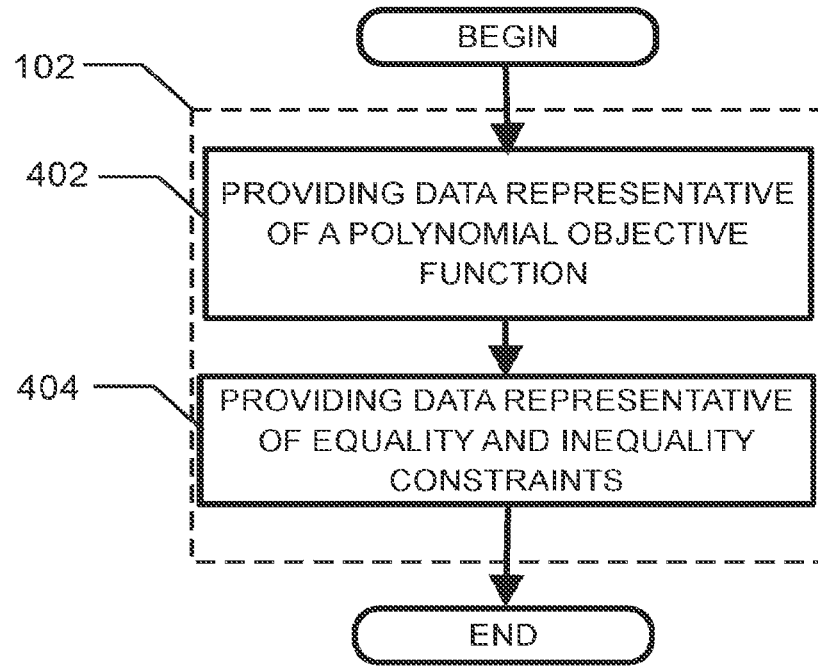
FIG. 4 is a flowchart that shows an embodiment for providing a binary polynomially constrained polynomial programming problem.

Now referring to FIG. 4, there is shown an embodiment for providing a binary polynomially constrained polynomial programming problem.

As mentioned above, the binary polynomially constrained polynomial programming problem can be represented as:

min $f(x)$
subject to $g_i(x)=0$ $\forall i \in \{1, \ldots, m\}$
$h_j(x) \leq 0$ $\forall j \in \{1, \ldots, l\}$
$x_k \in \{0,1\}$ $\forall k \in \{1, \ldots, n\}$ in which the functions $f(x)$, $g_i(x)$ and $h_j(x)$ are real polynomials in several variables.

According to processing step 402, data representative of a polynomial objective function $f(x)$ are provided.

According to processing step 404, data representative of the equality and inequality constraints $g_i(x)$ and $h_j(x)$ are provided.

It will be appreciated that the obtaining of a binary polynomially constrained polynomial programming problem may be performed according to various embodiments.

As mentioned above and in one embodiment, the binary polynomially constrained polynomial programming problem is provided by a user interacting with the digital computer 202.

Alternatively, the binary polynomially constrained polynomial programming problem is provided by another computer operatively connected to the digital computer 202.

Alternatively, the binary polynomially constrained polynomial programming problem is provided by an independent software package.

Alternatively, the binary polynomially constrained polynomial programming problem is provided by an intelligent agent.

Now referring to FIG. 1 and according to processing step 104, parameters of the software are initialized.

In one embodiment, the parameters of the software are initialized by the digital computer 202.

Figure 5:
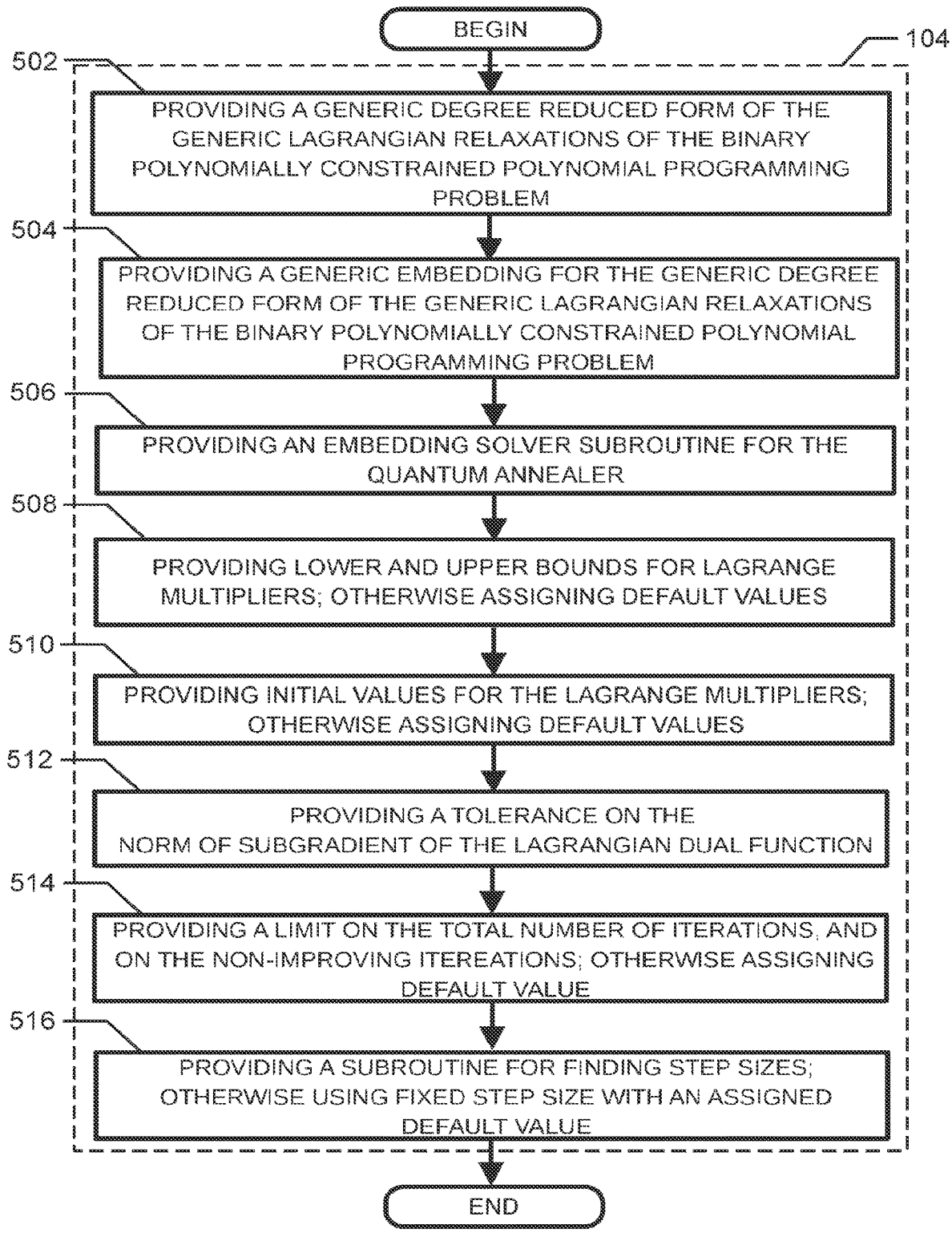
FIG. 5 is a flowchart that shows an embodiment for initializing software parameters used in an embodiment of the method for solving a Lagrangian dual of a binary polynomially constrained polynomial programming problem.

Now referring to FIG. 5, there is shown an embodiment for initializing parameters and subroutines or using default values for them.

According to processing step 502, a generic degree reduced form of the generic Lagrangian relaxations of the binary polynomially constrained polynomial programming problem is provided.

According to processing step 504, data representative of a generic embedding of the generic degree reduced form of the generic Lagrangian relaxations of the binary polynomially constrained polynomial programming problem is provided.

In one embodiment, the embedding is stored by a user in the namespace ORACLE, as ORACLE::embedding.

Still referring to FIG. 5 and according to processing step 506, an embedding solver subroutine is provided.

In one embodiment, the function is implemented by the user in the namespace ORACLE, as ORACLE::solve_qubo.

The input parameter of the embedding solver subroutine is a pointer to an instance of the data type ORACLE::qubo, representative of an unconstrained binary quadratic programming neglecting the corresponding bias of it.

The output of the embedding solver subroutine is a pointer to an instance of the type ORACLE::result, representative of a list of optimal and suboptimal solutions to the unconstrained binary polynomial programming problem.

The following is an example of a code snippet in C++ for providing the subroutine using the API developed by D-Wave Systems (Sapi 2.0). All the functions and types used in this snippet are supported by Sapi 2.0 except two auxiliary functions qubo_to_ising and spin_to_binary. The former function changes an unconstrained binary quadratic programming problem of type ORACLE::qubo, to an Ising spin problem of type sapi_problem by a change of variables s=2x−1. The second function received an array of vectors in {−1,1} and returns binary vectors by applying the inverse transformation $$x = \frac{1}{2}(s+1).$$

```c
*include <stdio.h>
#include <stdlib.h>
*include "dwave_sapi.h"
ORACLE::result* main(ORACLE::qubo& qubo) {
  sapi_globalInit();
  sapi_Problem* A = NULL;
  sapi_Problem* emb = NULL;
  sapi_Problem problem = qubo_to_ising(qubo);
  sapi_Embeddings* embeddings = NULL;
  sapi_FindEmbeddingParameters finder_param =
  SAPI_FIND_EMBEDDING_DEFAULT_PARAMETERS;
  sapi_IsingRangeProperties* range_prop = NULL;
  sapi_EmbedProblemResult* res = NULL;
  sapi_QuantumSolverParameters params
  =SAPI_QUANTUM_SOLVER_DEFAULT_PARAMETERS;
  sapi_IsingResult* answer = NULL;
  int* new solutions = NULL;
  double chain_ strength= -2.0;
  char err_msg[SAPI_ERROR_MESSAGE_MAX_SIZE];
  const char* url = "...";
  const char* token = "...";
  sapi_Connection* connection = NULL;
  sapi_remoteConnection(url, token, NULL, &connection, err_msg);
  sapi_getHardwareAdjacency(solver, &A);
  sapi_findEmbedding(&problem, A, &finder_param, &embeddings, err_msg);
  sapi_embedProblem(&problem, embeddings, A,0,0, range_prop, &res, err_msg);
  /* allocate space for new embedded problem result */
  emb = malloc(sizeof(sapi_Problem*));
  emb->len = res->problem.len + res->jc.len;
  emb->elements = (sapi_ProblemEntry*)malloc(sizeof(sapi_ProblemEntry) *
  emb->len);
  /* store embedded problem result in new problem */
  for(index = 0; index < res->problem.len; index++) {
    emb->elements[index].i = res->problem.elements[index].i;
    emb->elements[index].j = res->problem.elements[index].j;
    emb->elements[index].value = res->problem.elements[index]value;
  }
  for(; index < emb->len; index++) {
    emb->elements[index].i = res->jc.elements[index - res->
    problem.len].i;
    emb->elements[index].j = res->jc.elements[index - res->
    problem.len].j;
    emb->elements[index].value = chain_strength;
  }
  params.num_reads = 1000;
  sapi_solveIsing(solver, emb, (sapi_SolverParameters*)¶ms,
  &answer,err_msg);
  size_t num_new_solutions;
  new+solutions = malloc(answer->num_solutions * num_variables *
  sizeof(int*));
  sapi_unembedAnswer(answer->solutions, answer->solution_len, answer-
  >num_solutions,
embeddings, SAPI_BROKEN_CHAINS_MINIMIZE_ENERGY, &problem, new_solutions,
&num_new_solutions, err_msg);
  return spin_to_binary(new_solutions);
}
```

It will be appreciated that, in one embodiment, the providing of the unconstrained binary optimization problem to the quantum annealer 204 is achieved using the digital computer 202.

More precisely, it will be appreciated that in one embodiment a token system is used over the Internet to provide access to the quantum annealer 204 remotely and to authenticate use.

It will be appreciated that in one embodiment the at least one solution is provided in a table by the quantum annealer 204, according to the instructions of use of the quantum annealer 204.

In one embodiment, the D-Wave system, provides the at least one solution in the data type sapi_IsingResult* which is then type-casted automatically to an instance of QUBO::result*.

Still referring to FIG. 5 and according to processing step 508, lower and upper bounds for Lagrange multipliers are provided.

It will be appreciated that in one embodiment the providing of these real numbers of type double is achieved by overwriting the names ORACLE::dual_lb and ORACLE::dual_ub. Each of these types will be required to contain an array of doubles of size m+l. The first m entries of these arrays represent, respectively, the lower and upper bounds for the Lagrange multipliers corresponding to the m equality constraints and the last ? of them represent, respectively, the lower and upper bounds for the Lagrange multipliers corresponding to the ? inequality constraints.

It will be appreciated that if these names are not overwritten, the values of them are initialized with the default values.

In one embodiment, the default lower bound for a Lagrange multiplier corresponding to an equality constraint is −1e3 and the default upper bound for it is +1e3.

The default lower bound for a Lagrange multiplier corresponding to an inequality constraint is 0 and the default upper bound for it is +1e3.

Still referring to FIG. 5 and according to processing step 510, initial values for the Lagrange multipliers are provided.

It will be appreciated that the providing of these real valued numbers is achieved by overwriting the name ORACLE::dual_init_val with an array of doubles of size m+l. If this name is not overwritten, the values are initialized with default values.

The default initial value for any of the Lagrange multipliers, corresponding to any of equality or inequality constraints, is 0.

According to processing step 512, an error tolerance value on the norm of a subgradient of the Lagrangian dual is provided. If the norm of any subgradient of the Lagrangian relaxation falls below this tolerance, it is assumed that strong duality holds. In such case, the Lagrange multipliers are optimal. Unless overwritten by the user and according to one embodiment, the error tolerance value is initialized to 1e-5 and stored as ORACLE::tol. The error tolerance value is used in several points in the software.

According to one embodiment, ORACLE::tol is used for checking equality and inequality conditions. In particular, any system of inequalities LHS≤RHS is considered satisfied if the value of all entries in LHS−RHS is at most ORACLE::tol. Similarly, any system of equalities LHS=RHS is considered satisfied if the absolute value of all entries in LHS−RHS is at most ORACLE::tol.

Still referring to FIG. 5 and according to processing step 514, a limit on the total number of iterations is provided.

Unless overwritten by the user and according to one embodiment, the limit on the number of iterations is initialized to 1e3 and stored as ORACLE::MaxItr.

If the algorithm reaches ORACLE::MaxItr iterations of the processing step 116, it terminates and returns the at least one best-known primal-dual pair and the at least one best-known feasible solution.

According to processing step 514, a limit on the number of non-improving iterations is provided.

Unless overwritten by the user and according to one embodiment, the limit on the number of iterations is initialized to 10 and stored as ORACLE::MaxNonImpItr. If the best-known Lagrangian dual value does not increase in ORACLE::MaxNonImpItr iterations, the algorithm terminates and returns the at least one best-known primal-dual pair and the at least one best-known feasible solution.

According to processing step 516, a subroutine for finding the step size is provided.

In one embodiment, the subroutine is implemented by the user in the namespace ORACLE, as ORACLE::StepSize. If ORACLE::StepSize is not overwritten by the user, a fixed step size for a default value is used.

In one embodiment, the subroutine ORACLE::StepSize receives as input, an object of type double* representative of a search direction and returns as output, an object of type double representative of a step size.

In one embodiment, the search direction is the subgradient of the Lagrangian dual function and the step size is the fixed value of 1.

Now referring back to FIG. 1 and according to processing step 106, an unconstrained binary quadratic programming problem representative of the Lagrangian relaxation of the binary polynomially constrained polynomial programming problem (P) at the current values of the Lagrange multipliers is generated.

It will be appreciated that in one embodiment, the unconstrained binary quadratic programming problem representative of the Lagrangian relaxation of the binary polynomially constrained polynomial programming problem (P) at the current values of the Lagrange multipliers is generated by the digital computer 202.

More precisely, it will be appreciated that in the present embodiment, the generation of the unconstrained binary quadratic programming problem is achieved by substituting the current values of the Lagrange multipliers for the parameters $\lambda$ and $\mu$ in the generic degree reduced form $q_{\lambda,\mu}(x,y)$ of the generic Lagrangian relaxations of the binary polynomially constrained polynomial programming problem (P).

In one embodiment, the information of the unconstrained binary quadratic programming problem is stored in the name ORACLE::qubo.

Still referring to FIG. 1 and according to processing step 108, the subroutine ORACLE::solve_qubo is called with the unconstrained binary quadratic programming problem ORACLE::qubo and the embedding ORACLE::embedding as inputs in order to provide at least one corresponding solution for the unconstrained binary quadratic programming problem from the quantum annealer 204.

It will be appreciated that the at least one corresponding solution of the unconstrained binary quadratic programming problem is achieved in one embodiment with a pointer to an instance of type ORACLE::result.

Still referring to FIG. 1 and according to processing step 110, the at least one solution to the unconstrained binary quadratic programming problem is converted to a point in the domain of the binary polynomially constrained polynomial programming problem (P).

Still referring to FIG. 1 and according to processing step 112, a test is performed in order to determine if any of the at least one solution for the unconstrained binary quadratic programming problem corresponds to a feasible solution to the binary polynomially constrained polynomial programming problem (P).

According to the same processing step, the at least one best-known primal-dual pair, and the at least one best-known feasible solution, are updated.

Now referring to processing step 114, at least one corresponding solution of the unconstrained binary quadratic programming is used to generate a subgradient of the Lagrangian relaxation, $\delta_P(\lambda, \mu)$.

Figure 6:
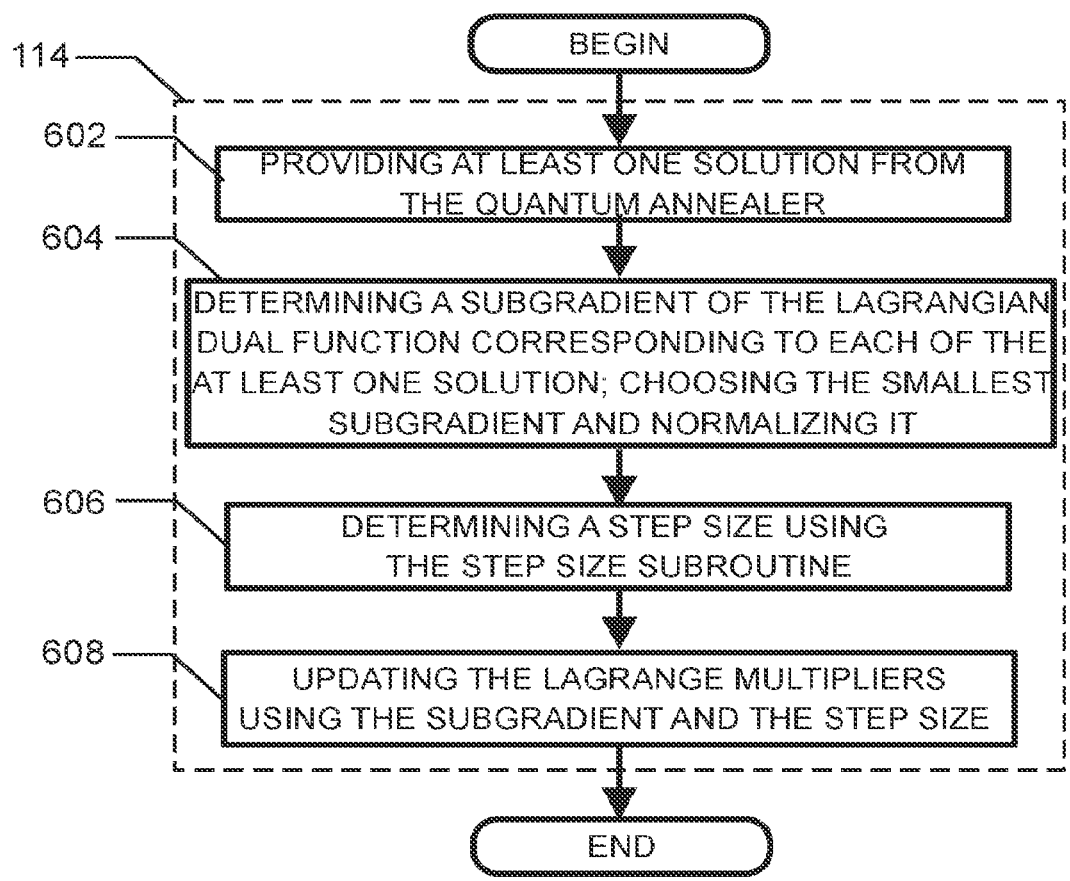
FIG. 6 is a flowchart that shows an embodiment of the proposed method for updating the Lagrange multipliers.

Now referring to FIG. 6, and according to processing step 602, at least one corresponding binary vector in the domain of the binary polynomially constrained polynomial programming problem (P) is provided.

According to processing step 604, a subgradient of the Lagrangian relaxation corresponding to the solution $\bar{x}$ of the unconstrained binary quadratic programming problem is derived as:

$$\nabla_{\lambda_i} L(\lambda,\mu) = g_i(\bar{x}) \text{ for } i=1,\ldots,m$$

$$\nabla_{\mu_j} L(\lambda,\mu) = h_j(\bar{x}) \text{ for } j=1,\ldots,l$$

In one embodiment, one may choose the subgradient with the smallest norm when multiple binary solutions of the unconstrained quadratic programming problem is provided.

In one embodiment, one may normalize the derived subgradient.

According to processing step 606, the derived subgradient is provided to the step size subroutine and a value for the step size is attained.

According to an embodiment, if a step size subroutine is initialized by the user, the step size $\alpha$ is found by a call to ORACLE::StepSize.

According to processing step 608, the Lagrange multipliers are updated as follows:

$\lambda_i^{new} = \lambda_i^{old} + \alpha \nabla_{\lambda_i} L(\lambda,\mu) = \lambda_i^{old} + \alpha g_i(\bar{x})$ for $i=1,\ldots,m$ $\mu_j^{new} = \mu_j^{old} + \alpha \nabla_{\mu_j} L(\lambda,\mu) = \mu_j^{old} + \alpha h_j(\bar{x})$ for $j=1,\ldots,l$ Now referring back to FIG. 1 and according to processing step 116, a test is performed in order to find out if the best-known value of $\delta_P(\lambda,\mu)$ has improved in the previous ORACLE::MaxNonImpItr steps.

In the case where the optimal value of $\delta_P(\lambda,\mu)$ has not improved in the past ORACLE::MaxNonImpItr steps and according to processing step 118, the results of the optimization are provided.

It will be appreciated that in one embodiment, the results comprise the set of all best known primal-dual pairs (x*, $\lambda$*, $\mu$*) and all best known feasible solutions.

In one embodiment, the results are stored using the digital computer in a file.

It will be appreciated that an advantage of the method disclosed herein is that it enables an efficient method for finding the solution of a binary polynomially constrained polynomial programming problem by finding the solution of its Lagrangian dual using a quantum annealer.

It will be further appreciated that the method disclosed herein improves the processing of a system for solving a Lagrangian dual of a binary polynomially constrained polynomial programming problem.

It will be appreciated that the Lagrange multipliers are updated iteratively until termination. The program terminates when either the norm of the subgradient of the Lagrangian dual function is at most ORACLE::tol or no improvement in the best known primal-dual pair is observed after ORACLE::MaxNonImpItr iterations, or after ORACLE::MaxItr iterations.

The following is an illustration of a use of the method described herein once applied to the maximum quadratic stable set problem.

Let G=(V, E) define a graph on n vertices; W be a symmetric square matrix of size n representing the weights of edges E; and A be the adjacency matrix of G. The maximum quadratic stable set problem is formulated as min $x^t$ W x,
subject to $x^t$ Ax=0
$x_i \in \{0,1\} \forall i \in \{1,\ldots,n\}$ It will be appreciated that by taking the negative of the objective function, the maximization objective function may be written as a minimization one as follows:

min $-x^t$ W x,
subject to $x^t$ Ax=0
$x_i \in \{0,1\} \forall i \in \{1,\ldots,n\}$ Moreover, it will be appreciated that the constraint $x^t Ax=0$ may be substituted with $x^t Ax \leq 0$. This is because both A and x are binary (i.e. $x^t Ax \geq 0$ for any binary vector $x \in \{0,1\}^n$) so $x^t Ax \leq 0$ is satisfied for all binary vectors x for which the identity $x^t Ax=0$ holds. The maximum quadratic stable set problem can be solved through the following formulation:

min $-x^t$ W x,
subject to $x^t Ax \leq 0$
$x_i \in \{0,1\} \forall i \in \{1,\ldots,n\}$ In one example, let a graph with 5 vertices represent a group of 5 coworkers. To each pair of coworkers, a utility factor is assigned for the collaboration between them. A utility factor is assigned to each individual for their performance; these values are on the diagonal of matrix W. The utilities can be represented with an upper triangular matrix:

$$W_u = \begin{pmatrix} 5 & 0 & 3 & 5 & 2 \\ 0 & -1 & 1 & -1 & 4 \\ 0 & 0 & 1 & 7 & 3 \\ 0 & 0 & 0 & 3 & 0 \\ 0 & 0 & 0 & 0 & 2 \end{pmatrix}$$

The utility matrix W may as well be represented by the 5×5 symmetric matrix $$W = \frac{1}{2}(W_u + W_u^t)$$

For the above example, W would be:

$$W = \begin{pmatrix} 5 & 0 & 1.5 & 2.5 & 1 \\ 0 & -1 & 0.5 & -0.5 & 2 \\ 1.5 & 0.5 & 1 & 3.5 & 15 \\ 2.5 & -0.5 & 3.5 & 3 & 0 \\ 1 & 2 & 1.5 & 0 & 2 \end{pmatrix}$$

Suppose each worker has a working shift and matrix A has nonzero entries for the pair of coworkers that have overlapping shifts:

$$A = \begin{pmatrix} 0 & 0 & 1 & 0 & 1 \\ 0 & 0 & 0 & 1 & 0 \\ 1 & 0 & 0 & 0 & 1 \\ 0 & 1 & 0 & 0 & 0 \\ 1 & 0 & 1 & 0 & 0 \end{pmatrix}$$

The problem of selecting the most productive team for a project such that no two team-members have overlapped shifts is an instance of the maximum quadratic stable set problem.

Give the above-defined matrices A and W the binary polynomially constrained polynomial programming problem min $-x^t$ W x,
subject to $x^t Ax \leq 0$
$x_i \in \{0,1\} \forall i \in \{1,\ldots,n\}$ is obtained according to processing step 102.

Since the two polynomials in the objective function and the inequality constraint of the above example are quadratic, the degree reduced form of the Lagrangian relaxation of this problem is the same as the Lagrangian relaxation itself. The embedding of a complete graph of size 5 is provided. The following code snippet provides an embedding of a complete graph of size 5 on a $K_{4,4}$-bipartite chimera block consisting of two parts each of size 4 and indexed by integers 0 to 3 in one part and by integers 4 to 7 in the second part.

sapi_Embeddings*ORACLE::embedding=NULL;
ORACLE:: embedding=(sapi_Embeddings*)malloc(sizeof (sapi_Embeddings)); ORACLE:: embedding→len=solver_properties→quantum_solver→num_qubits;
ORACLE::embedding→elements=malloc(sizeof(int)*embeddings→len); for (int i=0; i<ORACLE::embedding→len; i++) ORACLE::embedding→elements[i]=−1;
ORACLE::embedding→elements[0]=0;
ORACLE::embedding→elements[1]=1;
ORACLE::embedding→elements[5]=1;
ORACLE::embedding→elements[2]=2;

ORACLE::embedding→elements[6]=2;
ORACLE::embedding→elements[3]=3;
ORACLE::embedding→elements[7]=3;
ORACLE::embedding→elements[4]=4;

Lower and upper bounds of the Lagrangian multiplier are set as 0 and 100, respectively. 0 is assigned as the initial value of the Lagrangian multiplier. The tolerance on the norm of the subgradient of the Lagrangian dual function is set to $10^{-3}$. The limit on the total number of iterations and the number of non-improving iterations is set to 100 and 5, respectively. The step-size subroutine used in this example is a subroutine that provides the fixed step size of size 0.5 according to the following script double ORACLE::StepSize( ) {return 0.5;}

When the method starts, the list of best feasible solution and the best primal-dual pair is initialized as empty sets. The single Lagrangian multiplier of the presented method is initialized at $\lambda^1=0$, and the problem $$\min_{x \in \{0,1\}^n} -x^t W x$$

is solved by a quantum annealer. The attained optimal solution is $x^1=(1,1,1,1,1)$ and the optimal value is $-33$. Since $x^1$ is not feasible, the list of best feasible solution is not updated. The best primal-dual pair, however, is updated as $(x^1, \lambda^1)$.

The subgradient of the Lagrangian relaxation $$\min_{x \in \{0,1\}^n} -x^t W x + \lambda(x^t A x)$$

is $x^t A x=8$ for $x^1=(1,1,1,1,1)$. Suppose for the step-size subroutine, a fixed step-size of 0.5 is used. The next Lagrangian multiplier is then computed as $\lambda^2=0+0.5*8=4$.

The Lagrangian relaxation problem $$\min_{x \in \{0,1\}^n} -x^t W x + 4(x^t A x)$$

is solved by a quantum annealer. The optimal solution $x^2=(1,0,1,1,0)$ with optimal value $-16$ is obtained. The best primal-dual pair is updated as $(x^2, \lambda^2)$, but the best feasible solution is left as empty set since $x^2$ is not feasible.

The subgradient of the Lagrangian relaxation at this solution is 2. The next Lagrangian multiplier is then computed as $\lambda^3=4+0.5*2=5$ The Lagrangian relaxation problem $$\min_{x \in \{0,1\}^n} -x^t W x + 5(x^t A x)$$

is solved by a quantum annealer. The optimal solution $x^3=(1,0,1,1,0)$ with optimal value $-14$ is obtained. The best primal-dual pair is updated as $(x^3, \lambda^3)$, but the best feasible solution is left as empty set since $x^3$ is not feasible.

The subgradient of the Lagrangian relaxation at this solution is 2. The next Lagrangian multiplier is then computed as $\lambda^4=5+0.5*2=6$.

The Lagrangian relaxation problem $$\min_{x \in \{0,1\}^n} -x^t W x + 6(x^t A x)$$

is solved by a quantum annealer. The optimal solution $x^4=(1,0,0,1,0)$ with optimal value $-13$ is obtained. x4 is feasible, so the best feasible solution is updated as well as the best primal-dual pair $(x^4, \lambda^4)$.

At the current solution the norm of the subgradient of the Lagrangian relaxation is 0 and the method terminates. The best feasible solution x4=(1,0,0,1,0), and the best primal-dual pair $(x^4, \lambda^4)=((1,0,0,1,0),6)$ is reported.

For the present application, the obtained solution means that among all teams such that no two coworkers have overlapping shifts, team of workers 1 and 4 is the most productive team.

Canadian Patent Application No. 2,881,033, which is incorporated herein by reference, discloses a method for solving the Lagrangian dual of a constrained quadratic programming problem using a quantum annealer. The method disclosed is based on an outer Lagrangian linearization method. Unfortunately, a limitation of this method when used in conjunction with a quantum annealer is that there may be an appearance of error-prone unconstrained quadratic optimization problems in the process.

It will be appreciated that an advantage of the method disclosed herein is that it improves the processing of a system for solving a Lagrangian dual of a binary polynomially constrained polynomial programming problem. More precisely, the method disclosed herein is less prone to errors than prior-art methods, which is of great advantage.

It will be appreciated that a non-transitory computer-readable storage medium is further disclosed. The non-transitory computer-readable storage medium is used for storing computer-executable instructions which, when executed, cause a digital computer to perform a method for solving a Lagrangian dual of a binary polynomially constrained polynomial programming problem, the method comprising obtaining a binary polynomially constrained polynomial programming problem; until a convergence is detected, iteratively: providing a set of Lagrange multipliers, providing an unconstrained binary quadratic programming problem representative of a Lagrangian relaxation of the binary polynomially constrained polynomial programming problem at these Lagrange multipliers, providing the unconstrained binary quadratic programming problem to a quantum annealer, obtaining from the quantum annealer at least one corresponding solution, using the at least one corresponding solution to generate a new set of Lagrange multipliers; and providing all corresponding best-known primal-dual pairs of the Lagrangian dual of the binary polynomially constrained polynomial programming problem and best-known feasible solutions of the binary polynomially constrained polynomial programming problem after the convergence is detected.

Although the above description relates to specific embodiments as presently contemplated by the inventors, it will be understood that the invention in its broad aspect includes functional equivalents of the elements described herein.

What is claimed is:

1. A method for solving a computational problem comprising a Lagrangian dual of a binary polynomially constrained polynomial programming problem, the method comprising:
   (a) providing, at a digital computer, said binary polynomially constrained polynomial programming problem;
   (b) using said digital computer to obtain an unconstrained binary quadratic programming problem representative of a Lagrangian relaxation of said binary polynomially constrained polynomal programming problem at a set of Lagrange multipliers;
   (c) using said digital computer to direct said unconstrained binary quadratic programming problem to a binary optimizer over a communications network for executing said unconstrained binary quadratic programming problem;
   (d) using said digital computer to obtain from said binary optimizer at least one solution corresponding to said unconstrained binary quadratic programming problem;
   (e) using said digital computer to generate an updated set of Lagrange multipliers using a subgradient derived from said at least one solution corresponding to said unconstrained binary quadratic programming problem; and
   (f) using said distal computer to output a report indicative of at least one solution of said binary polynomially constrained polynomial programming problem based on said updated set of Lagrange multipliers.

2. The method of claim 1, wherein said binary optimizer comprises at least one of a quantum computer, quantum annealer, or an opto-electronic device.

3. The method of claim 1, wherein said subgradient in (e) is of a Lagrangian dual of said binary polynomially constrained polynomial programming problem.

4. The method of claim 1, wherein (b)-(e) are repeated at least once; and wherein for each repetition said Lagrangian relaxation of said binary polynomially constrained polynomial programming problem in (b) is at said updated set of Lagrange multipliers generated during a preceding iteration.

5. The method of claim 1, wherein (b)-(e) are configured to be repeated until convergence is detected; and wherein for each repetition said Lagrangian relaxation of said binary polynomially constrained polynomial programming problem in (b) is at said updated set of Lagrange multipliers generated during a receding iteration.

6. The method of claim 1, wherein (f) comprises providing corresponding best-known primal-dual pairs of said Lagrangian dual of said binary polynomially constrained polynomial programming problem and best-known solutions of said binary polynomially constrained polynomial programming problem after a convergence is detected.

7. The method of claim 1, wherein (a) comprises:
   (i) obtaining data representative of a polynomial objective function;
   (ii) obtaining data representative of polynomial equality constraints; and
   (iii) obtaining data representative of polynomial inequality constraints.

8. The method of claim 1, wherein said binary polynomially constrained polynomial programming problem is provided by at least one of a user, a computer, a software package, or an intelligent agent.

9. The method of claim 1, wherein (a) further comprises initializing software parameters and providing a step size subroutine.

10. The method of claim 9, wherein said initializing software comprises providing a generic degree reduced form of generic Lagrangian relaxations of said binary polynomially constrained polynomial programming problem as a parameterized family of binary quadratic functions in original and auxiliary variables, wherein said family is parameterized by Lagrange multipliers.

11. The method of claim 10, further comprising:
    (i) providing a generic embedding of generic degree reduced forms of said generic Lagrangian relaxations of said binary polynomially constrained polynomial programming problem;
    (ii) providing an embedding solver function configured to provide a list of solutions;
    (iii) providing initial values or default values for said set of Lagrange multipliers;
    (iv) providing an error tolerance value for a convergence criteria; and
    (v) providing an integer representative of a limit on a total number of iterations and a limit on a total number of non-improving iterations.

12. The method of claim 1, further comprising generating an initial Lagrangian relaxation of said binary polynomially constrained polynomial programming problem using an initial set of Lagrange multipliers.

13. The method of claim 1, wherein (f) comprises storing said report to a file.

14. A system comprising a distal computer and a binary optimizer communicatively coupled to said digital computer through a communications network, wherein said digital computer is configured to:
    (i) provide a binary polynomially constrained polynomial programming problem;
    (ii) obtain an unconstrained binary quadratic programming problem representative of a Lagrangian relaxation of said binary polynomially constrained polynomial programming problem at a set of Lagrange multipliers;
    (iii) direct said unconstrained binary quadratic programming problem to said binary optimizer over said communications network for executing said unconstrained binary quadratic programming problem;
    (iv) obtain from said binary optimizer at least one solution corresponding to said unconstrained binary quadratic programming problem;
    (v) generate an updated set of Lagrange multipliers using a subgradient derived from said at least one solution corresponding to said unconstrained binary quadratic programming problem; and
    (vi) output a report indicative of at least one solution of said binary polynomially constrained polynomial programming problem based on said updated set of Lagrange multipliers.

15. The system of claim 14, wherein said binary optimizer comprises at least one of a quantum computer, a quantum annealer, or an opto-electronic device.

16. The system of claim 14, wherein said subgradient in (v) is of a Lagrangian dual of said binary polynomially constrained polynomial programming problem.

17. The system of claim 14, wherein (ii)-(v) are repeated at least once; and wherein for each repetition said Lagrangian relaxation of said binary polynomially constrained polynomial programming problem in (ii) is at said updated set of Lagrange multipliers generated during a preceding iteration.

18. The system of claim 14, wherein (ii)-(v) are configured to be repeated until convergence is detected; and wherein for each repetition said Lagrangian relaxation of said binary polynomially constrained polynomial programming problem in (ii) is at said updated set of Lagrange multipliers generated during a preceding iteration.

19. The system of claim 18, wherein at (vi) said digital computer is configured to provide corresponding best-known primal-dual pairs of a Lagrangian dual of said binary polynomially constrained polynomial programming problem and best-known feasible solutions of said binary polynomially constrained polynomial programming problem after said convergence is detected.

20. The system of claim 14, wherein said binary polynomially constrained polynomial programming problem is configured to be provided by at least one of a user, a computer, a software package, or an intelligent agent.

* * * * *